United States Patent
Kim et al.

(10) Patent No.: US 10,476,687 B2
(45) Date of Patent: Nov. 12, 2019

(54) METHOD AND APPARATUS FOR PROVIDING SERVICE IN USER EQUIPMENT OF MOBILE COMMUNICATION SYSTEM

(71) Applicant: Samsung Electronics Co., Ltd., Suwon-si, Gyeonggi-do (KR)

(72) Inventors: Hyejeong Kim, Suwon-si (KR); Hong Kim, Seoul (KR); Yunsang Park, Suwon-si (KR); Sangsoo Jeong, Suwon-si (KR); Songyean Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 167 days.

(21) Appl. No.: 14/943,750

(22) Filed: Nov. 17, 2015

(65) Prior Publication Data

US 2016/0142218 A1 May 19, 2016

(30) Foreign Application Priority Data

Nov. 18, 2014 (KR) .......................... 10-2014-0161186

(51) Int. Cl.
*H04L 12/50* (2006.01)
*H04L 12/14* (2006.01)
*H04M 15/00* (2006.01)
*H04W 4/24* (2018.01)

(52) U.S. Cl.
CPC ...... *H04L 12/1407* (2013.01); *H04L 12/1475* (2013.01); *H04M 15/8083* (2013.01); *H04W 4/24* (2013.01); *H04M 15/66* (2013.01); *H04M 2215/0192* (2013.01)

(58) Field of Classification Search
CPC ........................................................ H04L 12/28
USPC ........................................................ 370/259
See application file for complete search history.

(56) References Cited

U.S. PATENT DOCUMENTS

| | | | |
|---|---|---|---|
| 2002/0028687 A1* | 3/2002 | Sato ...................... | H04L 1/1678 455/466 |
| 2007/0266292 A1* | 11/2007 | Korndewal ............ | H04L 1/188 714/749 |
| 2008/0287096 A1 | 11/2008 | Aaltonen et al. | |
| 2013/0132854 A1* | 5/2013 | Raleigh ................. | G06F 3/0482 715/738 |
| 2013/0260715 A1 | 10/2013 | Li et al. | |
| 2013/0316674 A1 | 11/2013 | Cho et al. | |
| 2014/0036785 A1 | 2/2014 | Li et al. | |
| 2014/0348029 A1 | 11/2014 | Lee et al. | |
| 2014/0371912 A1* | 12/2014 | Passot .................... | G06N 3/049 700/264 |
| 2016/0127936 A1* | 5/2016 | Chatterjee ............ | H04B 7/0626 370/252 |

FOREIGN PATENT DOCUMENTS

WO 2013/085314 A1 6/2013

* cited by examiner

*Primary Examiner* — Dang T Ton
(74) *Attorney, Agent, or Firm* — Jefferson IP Law, LLP

(57) ABSTRACT

A method for transmitting and receiving a signal by a terminal in a mobile communication system is provided. The method includes transmitting a first message including information related to a service to a core network, receiving a response to the first message from the core network, and transmitting or receiving traffic related to the service based on the response.

21 Claims, 23 Drawing Sheets

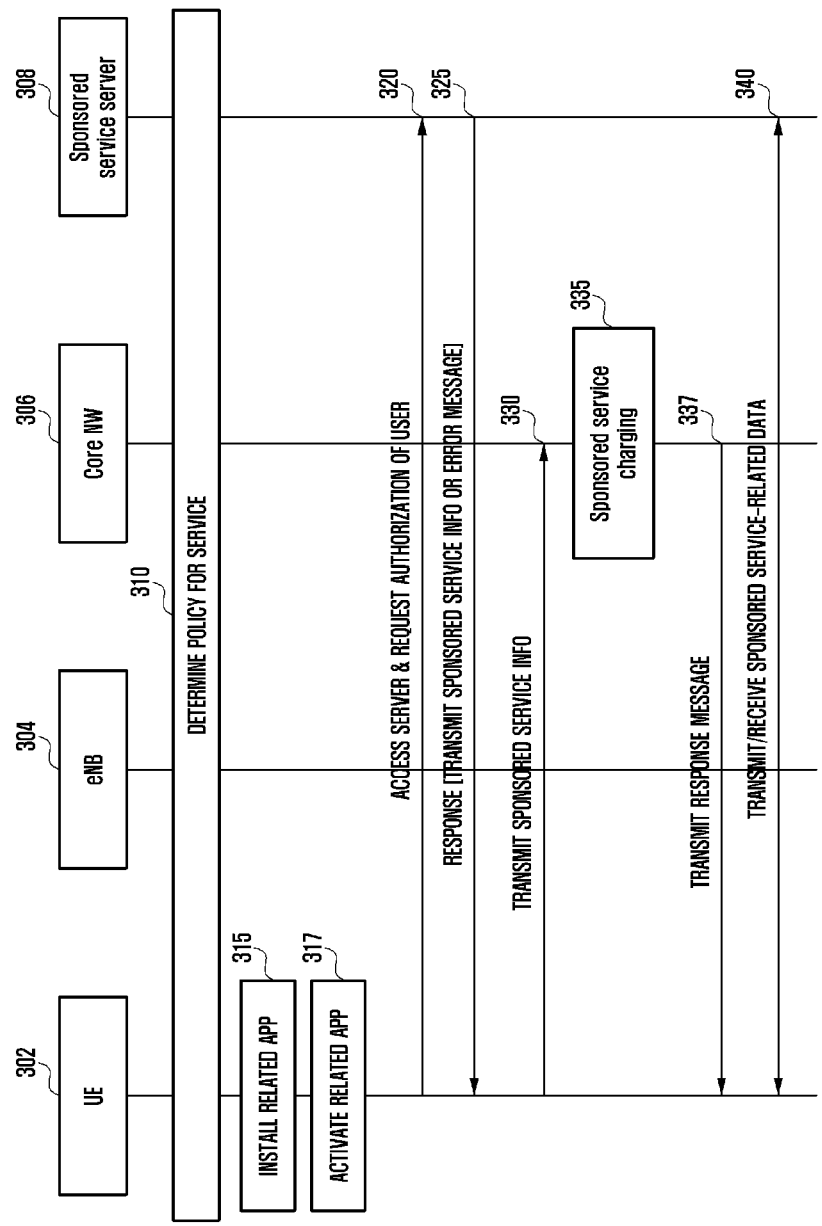

METHOD AND APPARATUS FOR PROVIDING SERVICE IN USER EQUIPMENT OF MOBILE COMMUNICATION SYSTEM

CROSS-REFERENCE TO RELATED APPLICATION(S)

This application claims the benefit under 35 U.S.C. § 119(a) of Korean patent application filed on Nov. 18, 2014 in the Korean Intellectual Property Office and assigned Serial number 10-2014-0161186, the entire disclosure of which is hereby incorporated by reference.

TECHNICAL FIELD

The present disclosure relates to a method and an apparatus for providing a service in a user equipment (UE) of a mobile communication system. More particularly, the present disclosure relates to operating methods of a UE and a network for providing a sponsored service in the UE of a mobile communication system, and an apparatus using the same.

BACKGROUND

A content market of mobile communication services is getting larger, and service providers and advertisers are finding more various methods in relation to business models associated with users. In addition, the demand in the mobile content market is associated with the use of mobile applications, and content service providers are addressing a method which can provide data communication expenses of users for the sake of investment. More particularly, content providers have a high degree of closeness to mobile applications, and may bear a portion of the communication expenses in order to sell more pieces of content to users who are enthusiastic about purchasing mobile devices. Here, examples of the service providers may include on-line shopping malls, streaming service providers, mobile game providers, and map service providers. In order to earn more service-related income, the service provider needs to provide a sponsored service which provides communication expenses of users. However, currently, only a limited service method is provided in relation to the sponsored service. The term "sponsored service" may commonly refer to a service in which a content provider or a particular operator, that provides an advertisement and the like, provides content to a user and bears communication costs incurred to provide the content.

FIG. 1 illustrates a node of a communication system for providing a sponsored service according to the related art.

Referring to FIG. 1, a user equipment (UE) 110 may receive data through a core network including a base station (or an evolved Node B (eNB)) 120 and a packet data network gateway (PGW) 130. A sponsored service provider 150 may provide a sponsored service to a user through a proxy server 140. In an embodiment of the present disclosure, the sponsored service provider 150 may include a server that the sponsored service provider 150 operates. In this case, the sponsored service provider 150 needs to use the proxy server 140 to provide the sponsored service, and an operator, that operates a communication network, recognizes the sponsored service in response to only data transmitted/received through the proxy server 140 and does not charge a usage fee, and thereby the sponsored service provider 150 can provide content to a user without communication expenses. However, when a service is provided through this system, it is problematic that the diversity of services is reduced, an operator can provide only a service defined by the operator, and thus the flexibility of services is reduced. In addition, it is problematic that the service provider or the user provides the proxy server with related information, such as subscriber information, service provider information, and the like, that the service provider or the user does not desire to provide to the network operator or the proxy server operator. Further, in terms of costs, it is problematic that the separate proxy server needs to be disposed. Therefore, there is a need for a method and an apparatus for more efficiently providing the sponsored service.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address the above-mentioned problems and/or disadvantages and to provide at least the advantages described below. Accordingly, an aspect of the present disclosure is to provide a method and an apparatus for enabling information related to the provision of a sponsored service to be flexibly exchanged between a user equipment (UE) and a network.

Another aspect of the present disclosure is to provide a sponsored service under different conditions according to the demands of a service provider and a network operator in relation to the sponsored service.

Another aspect of the present disclosure is to provide a platform which enables easy access to a service in relation to a sponsored service and can be extended.

Another aspect of the present disclosure is to provide a method and an apparatus which can more efficiently provide information to a user of a UE in relation to a sponsored service, and enable the use of the sponsored service.

In accordance with an aspect of the present disclosure, a method for transmitting/receiving a signal by a UE in a mobile communication system is provided. The method includes transmitting a first message including information related to a service to a core network, receiving a response to the first message from the core network, and transmitting/receiving traffic related to the service based on the response.

In accordance with another aspect of the present disclosure, a UE for transmitting/receiving a signal in a mobile communication system is provided. The UE includes a transmission/reception unit configured to transmit/receive a signal, and a control unit configured to control the transmission/reception unit, transmit a first message including information related to a service to a core network, receive a response to the first message from the core network, and transmit/receive traffic related to the service based on the response.

According to various embodiments of the present disclosure, the sponsored service can be flexibly provided to a user on more various platforms. In addition, methods and conditions for providing the sponsored service can be more variously and easily applied, the convenience of the user can be improved, and the likelihood of the occurrence of a security-related issue can be reduced. Further, information can be more easily provided to the user who uses the sponsored service, and the convenience of the user can be improved.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 3 is a signal flow diagram illustrating a method for exchanging signals between respective entities in order to provide a sponsored service according to an embodiment of the present disclosure;

Throughout the drawings, it should be noted that like reference numbers are used to depict the same or similar elements, features, and structures.

DETAILED DESCRIPTION

Figure 1:
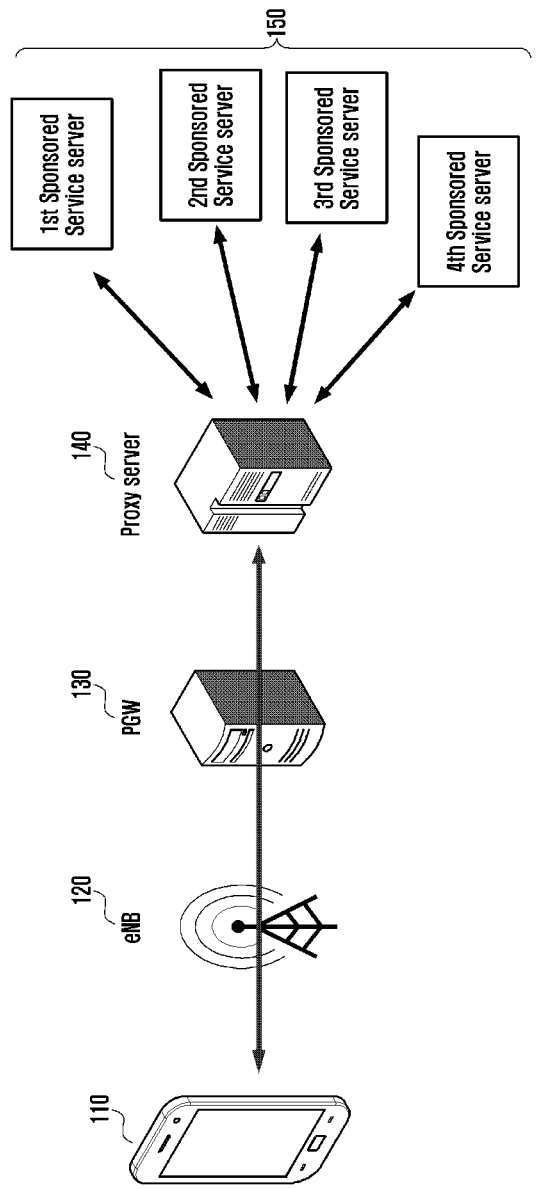
FIG. 1 illustrates a node of a communication system for providing an existing sponsored service according to the related art.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

In describing the various embodiments of the present disclosure, descriptions related to technical contents which are well-known in the art to which the present disclosure pertains, and are not directly associated with the present disclosure, will be omitted. Such an omission of unnecessary descriptions is intended to prevent obscuring of the main idea of the present disclosure and more clearly transfer the main idea.

For the same reason, in the accompanying drawings, some elements may be exaggerated, omitted, or schematically illustrated. Further, the size of each element does not entirely reflect the actual size. In the drawings, identical or corresponding elements are provided with identical reference numerals.

The advantages and features of the present disclosure and ways to achieve them will be apparent by making reference to embodiments as described below in conjunction with the accompanying drawings. However, the present disclosure is not limited to the various embodiments set forth below, but may be implemented in various different forms. The following embodiments are provided only to completely disclose the present disclosure and inform those skilled in the art of the scope of the present disclosure, and the present disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which perform through the processor of the computer or other programmable data processing apparatus, create a method for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instructions that implement the function specified in the flowchart block or blocks. The computer program instructions may also be loaded onto a computer or other programmable data processing apparatus to cause a series of operations to be performed on the computer or other programmable apparatus to produce a computer implemented process such that the instructions that perform on the computer or other programmable apparatus provide operations for implementing the functions specified in the flowchart block or blocks.

Each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be performed concurrently or the blocks may sometimes be performed in the reverse order, depending upon the functionality involved.

As used herein, the "unit" or "module" refers to a software element or a hardware element, such as a field programmable gate array (FPGA) or an application specific integrated circuit (ASIC), which performs a certain function. However, the "unit" or "module" does not always have a meaning limited to software or hardware. The "unit" or "module" may be constructed either to be stored in an addressable storage medium or to command one or more processors. Therefore, the "unit" or "module" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" or "module" may be either combined into a smaller number of elements, "unit", or "module" or divided into a larger number of elements, "unit", or "module". Moreover, the elements and "units" or "modules" may be implemented to reproduce one or more central processing units (CPUs) within a device or a security multimedia card.

Figure 2A:
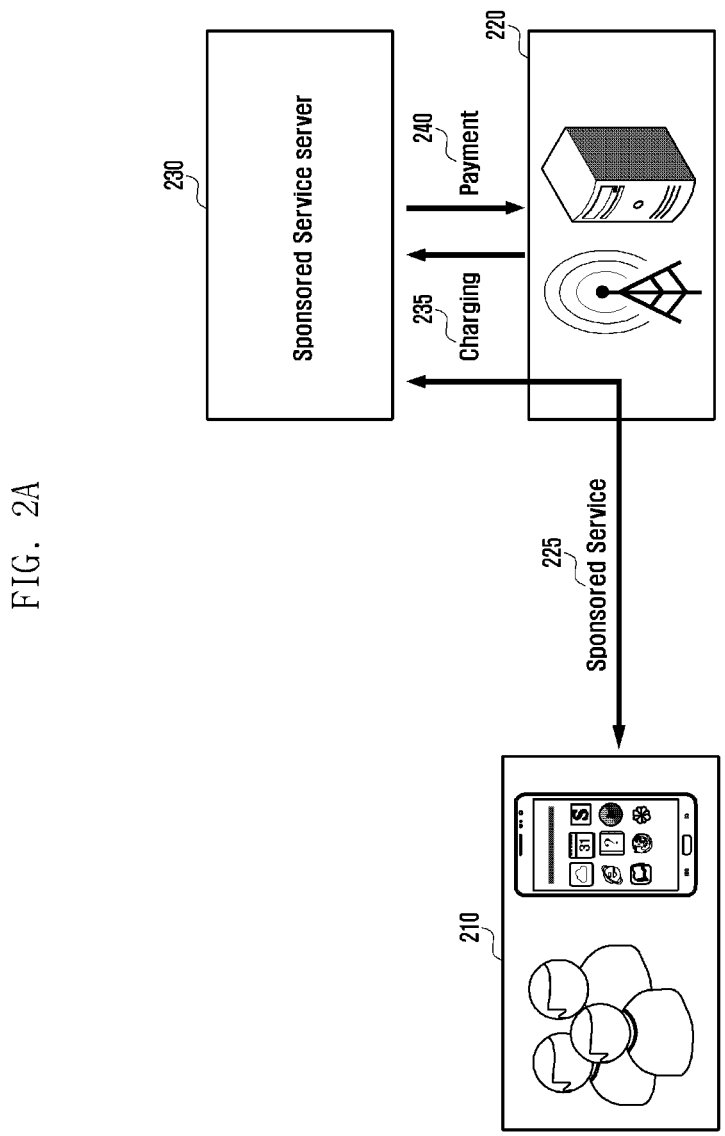
FIG. 2A illustrates a method for providing a sponsored service according to an embodiment of the present disclosure.

FIG. 2A illustrates a method for providing a sponsored service according to an embodiment of the present disclosure.

Referring to FIG. 2A, signals may be transmitted and received among a user equipment (UE) 210, a communication network 220, and a sponsored service server 230, and a sponsored service may be provided to the UE 210.

More particularly, a sponsored service may be provided through an application preloaded into the UE 210 or an application downloaded thereto. More specifically, the sponsored service may be provided according to a setting which is preset among a manufacturer of a UE, a communication network operator, and a sponsored service provider. When the UE 210 is provided with the sponsored service as indicated by reference numeral 225, an operator operating the communication network 220 may charge an operator of the sponsored service server 230 (i.e., a charging operation 235), and the operator of the sponsored service server 230 may pay (as indicated by reference numeral 240) the operator of the communication network 220 a communication fee for the sponsored service used by the UE 210. In an embodiment of the present disclosure, the sponsored service operator and the operator of the sponsored service server 230 may be both an identical main agent, or may be different main agents.

In addition, when in order to provide the above-described sponsored service, the UE 210 receives sponsored service-related information from the sponsored service server 230 and provides the relevant information to the communication network 220, the communication network 220 may not charge for traffic of the sponsored service provided to the UE 210, based on the relevant information. Further, the operator of the sponsored service server 230 may operate the sponsored service in such a manner as to distribute a related application to the UE 210. The operator of the sponsored service server 230 may deliver sponsored service-related information to the communication operator (as indicated by reference numeral 220), and may perform a procedure (e.g., authentication, and the like) based on the sponsored service-related information.

Figure 2B:
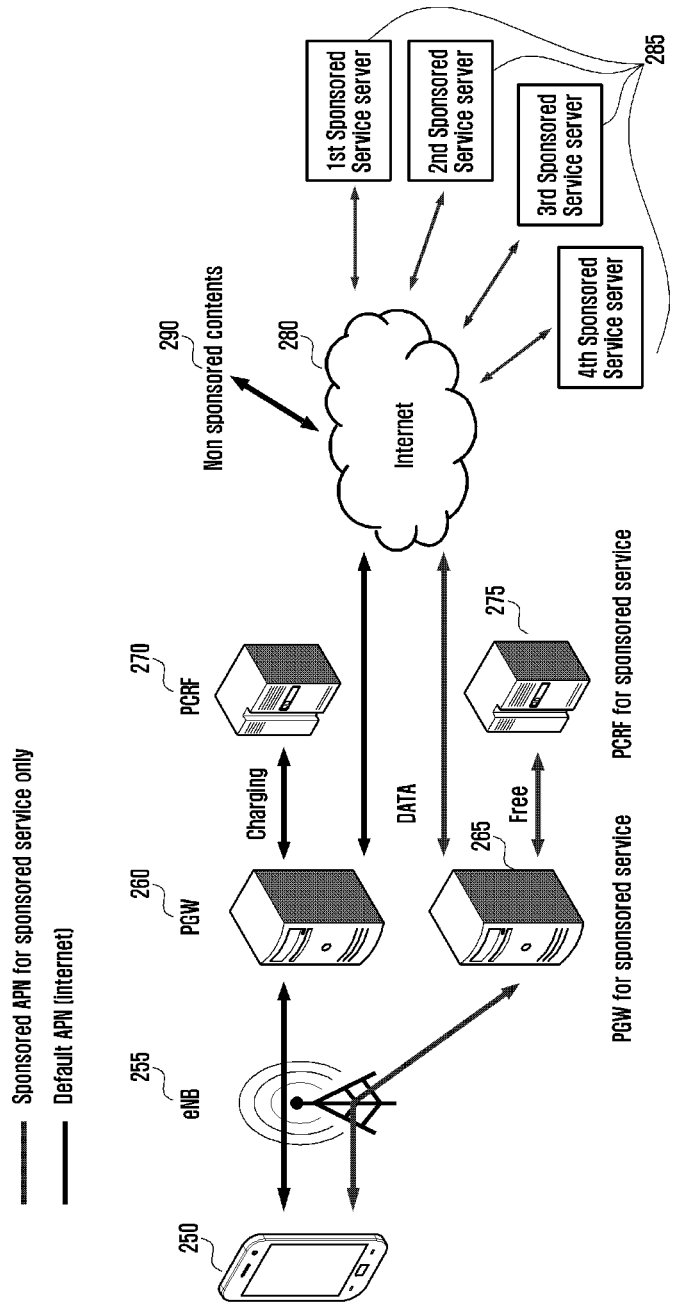
FIG. 2B illustrates a method for providing a sponsored service according to an embodiment of the present disclosure.

FIG. 2B illustrates a method for providing a sponsored service according to an embodiment of the present disclosure.

A communication network may define a separate access point name (APN) for a sponsored service. In this case, through a sponsored APN, a sponsored service may be provided even to a user who cannot use a wireless data service, for example, a user who does not subscribe to a data plan, a user who has used up the personal data limit, and the like. Specifically, in the network, a sponsored APN allows access within a defined range regardless of a data plan of the user. The sponsored APN is used for data communication using a sponsored application. When the sponsored application simultaneously provides the sponsored service and a non-sponsored service, the non-sponsored service may also be processed through the sponsored APN. Specifically, the sponsored APN may cause the user to be charged for the non-sponsored service.

Referring to FIG. 2B, a UE 250, a base station 255, packet data network gateways (PGWs) 260 and 265, and policy and charging rules functions (PCRFs) 270 and 275 may mutually transmit and receive signals, and may provide a service by transmitting and receiving signals to/from a sponsored service server 285 and a non-sponsored service server 290 through an Internet 280.

At this time, there may exist the PGW 260 that transmits/receives non-sponsored service-related data, and the PGW 265 that transmits/receives sponsored service-related data. According to an embodiment of the present disclosure, the PGW 260 and the PGW 265 for the sponsored service may be configured as an identical entity or different entities. In addition, there may exist the PCRF 270 that performs charging and policy processing related to traffic of the non-sponsored service, and the PCRF 275 that performs charging and policy processing related to traffic of the sponsored service. According to an embodiment of the present disclosure, the PCRF 270 and the PCRF 275 for the sponsored service may be configured as an identical entity or different entities.

At this time, the PCRF 270 may charge for the traffic of the non-sponsored service that the PGW 260 transmits/receives, and the PCRF 275 for the sponsored service may provide, for free, the traffic of the sponsored service that the PGW 265 for the sponsored service transmits/receives.

As described above, the sponsored service may be provided by changing a structure of a node of a core network. In the above-described embodiment of the present disclosure, the UE 250 may be provided with the sponsored service by separating an APN. More specifically, in order to transmit/receive sponsored service-related traffic, an APN, which enables a connection to a network related to the sponsored service, may be designated and a signal may be transmitted/received by using the designated APN. In addition, when the UE starts a service related to the sponsored service, the APN related to the sponsored service may cause the UE to have automatic access to the network.

FIG. 3 is a signal flow diagram illustrating a method for exchanging signals between respective entities in order to provide a sponsored service according to an embodiment of the present disclosure.

Referring to FIG. 3, in an embodiment of the present disclosure, a UE 302, a base station 304, a core network 306, and a sponsored service server 308 may transmit and receive signals thereamong. More specifically, the UE 302, the base station 304, the core network 306, and the sponsored service server 308 may transmit and receive traffic of a sponsored service and that of a non-sponsored service which are provided to the UE 302 thereamong.

In operation 310, a policy for a service may be determined between the respective entities. More specifically, related information for a sponsored service may be exchanged between the respective entities. The related information may be preset, but may be additionally set by transmitting the related information to another entity through the transmission/reception of a message after the service starts. In an embodiment of the present disclosure, the policy for the service may be determined through an agreement between the respective operators. In addition, the related information may include information capable of distinguishing traffic of the sponsored service from general traffic which is different from the traffic of the sponsored service.

In operation 315, a sponsored service-related application may be installed in the UE 302. In an embodiment of the present disclosure, the application may be preloaded into a released UE, or may be subsequently downloaded to the UE by a user. In addition, the sponsored service-related application may include information for providing a service. The information may include at least one of a service IDentifier (ID), basic uniform resource locator (URL), a service plan, and token information.

In an embodiment of the present disclosure, the service ID may be an identifier of the sponsored service-related application, or may be a URL of a site which provides the sponsored service. When the service ID is a URL, the sponsored service may be performed by using even a general application which is not a separate application which provides the sponsored service.

In operation 317, the sponsored application may be activated in the UE 302.

In operation 320, the relevant application may access the sponsored service server and may perform a user authorization process. In an embodiment of the present disclosure, the relevant process may be changed according to an application, and there may be an application which does not require an authorization process according to an embodiment of the present disclosure.

In operation 325, the sponsored service server transmits, to the UE, sponsored service information on the relevant user. In an embodiment of the present disclosure, when a pre-defined condition is not satisfied as in the case of the failure of user authorization in operation 320 for user authorization, and the like, the sponsored service server may transmit an error message (e.g., reject) to the UE 302.

In operation 325, the sponsored service server 308 may determine the validity and the like of an application installed in the UE based on the request message, and may transmit, to the UE 302, a token including the sponsored service information based on a result of the determination.

In an embodiment of the present disclosure, the token information may include at least one piece of information among an identifier for identifying a sponsored service, a time point of issuing the token, a service plan related to the token, an internet protocol (IP) address related to the service, a URL list related to the service, a valid time period, the total amount of data which can be used with the token, a particular random number, and integrity-related information. In addition, in all embodiments of the present disclosure, the UE may deliver user subscription information together with the token information to the core network, and the core network may provide a sponsored service based on the received information.

Based on the token information, the UE 302 may subsequently transmit/receive traffic of the sponsored service without charging in the core network.

In operation 330, the UE 302 may transmit the sponsored service information to the core network 306. The sponsored service information may include the token information that the sponsored service server has received (indicated by reference numeral 325), or token information stored in the UE 302, and may further include information which allows the UE 302 to receive a sponsored service.

In operation 335, the core network 306 may apply a sponsored charging rule to a sponsored service-related packet based on the received information. In an embodiment of the present disclosure, the sponsored charging rule may charge for the traffic usage of the user by using a method for counting a packet, or a separate method. In an embodiment of the present disclosure, the core network may include at least one of a PGW and a PCRF.

In operation 337, the core network 306 may transmit a response message to the UE 302.

In operation 340, the UE 302 may transmit/receive sponsored service-related data to/from the UE 302. In operation 340, the core network 306 may apply respective charging policies to the sponsored service and the non-sponsored service in such a manner as to distinguish the sponsored service from the non-sponsored service.

According to the above-described embodiment of the present disclosure, in order to receive the sponsored service, the user may perform operations, such as authentication, registration of a service, start of the service, termination of the service, transmission/reception of data, charging, and exchange of service-related information.

Figure 4:
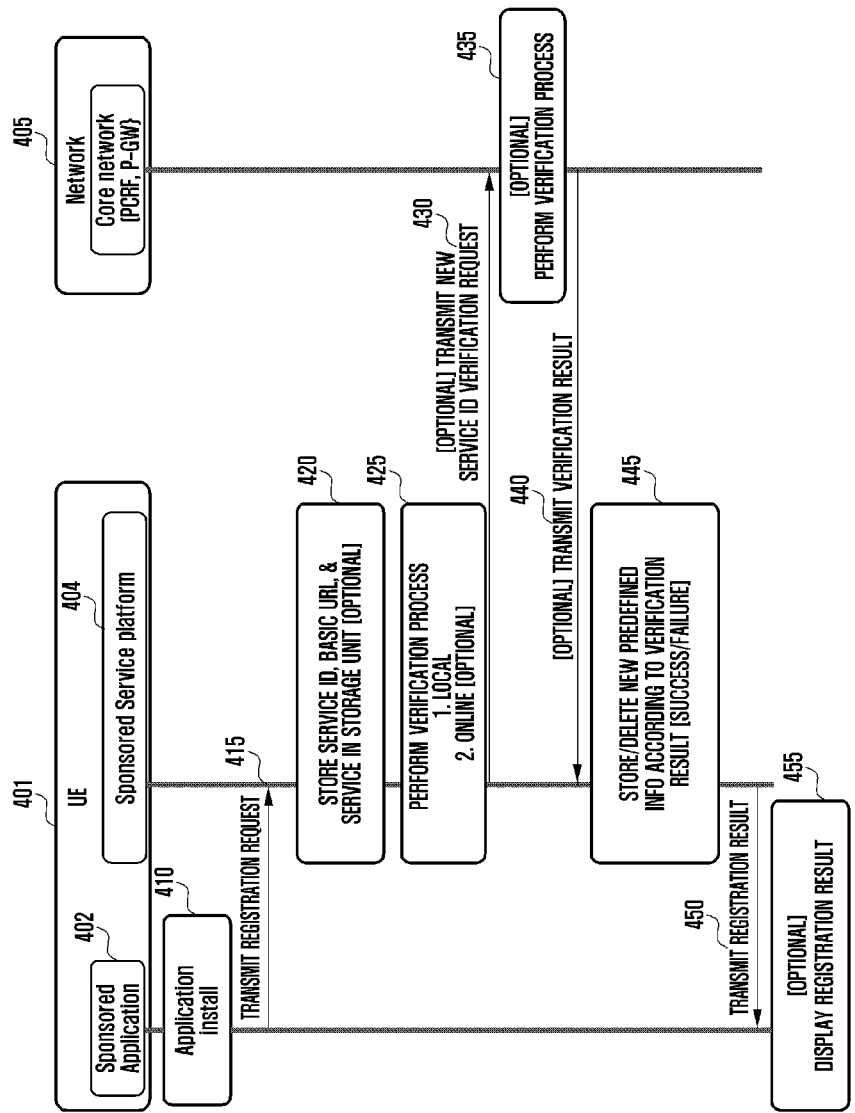
FIG. 4 is a signal flow diagram illustrating a method for registering a sponsored service according to an embodiment of the present disclosure.

FIG. 4 is a signal flow diagram illustrating a method for registering a sponsored service according to an embodiment of the present disclosure.

Referring to FIG. 4, a UE 401 may transmit/receive a signal to/from a network 405. The UE 401 may include an application layer 402 and a platform layer 404, and enables the exchange of information between the respective layers. In addition, the network 405 may include a core network, and may be at least one of the PCRF and the PGW. In an embodiment of the present disclosure, the network 405 may be a sponsored service-related network entity, such as an application function (AF), and the like.

In operation 410, an application may be installed in the application layer 402. The installed application may be preloaded into the UE or may be downloaded to the UE, and may be installed therein.

In operation 415, the application layer 402 may transmit a registration request message to the platform layer 404. In an embodiment of the present disclosure, the registration request message may include a service ID of an application, a basic URL for receiving a service, and a sponsored service-related service plan. In an embodiment of the present disclosure, the downloaded application may not include service ID information of an application, which is preset in the platform layer 404, basic URL information, and service plan information. In this case, the UE determines whether the relevant application is a valid sponsored service, by using a defined verification process, and may perform a registration procedure. When preset information exists, the UE may compare the received information with the preset information and may perform a registration procedure.

In operation 420, the platform layer 404 may store the received information. When the preset information exists, the UE may perform a next operation by utilizing the stored information of the information. In an embodiment of the present disclosure, operation 420 may be selectively performed, and the UE may perform the next operation without performing a separate storage operation.

In operation 425, the platform layer 404 may perform a verification procedure for verifying the application. When the preset information exists and information related to the application is stored in the platform layer 404, or when a defined verification scheme exists, the verification procedure may be locally performed within the UE 401, and may be performed according to a result of comparing the received information with the stored information, or according to the defined verification scheme. Alternatively, the verification procedure may be performed by inquiring about the relevant information of the network. The verification procedure, which is performed online, may be additionally performed after the local verification, or may be selectively performed when it is impossible to perform the local verification. In addition, even when application-related information is stored in the platform layer 404, if it is necessary to update the application-related information, the verification procedure, which is performed online, may be performed. The case where it is necessary to update the application-related information may include a case of the passage of a preset time period.

In operation 430, the platform layer 404 may transmit, to the network 405, a verification request message including a service ID of the application for the verification procedure.

In operation 435, the network 405 may perform a verification process, such as a comparison of the received information with the stored information, and the like. More specifically, the network 405 may determine whether the received service ID coincides with a preset service ID for a sponsored service. A service ID of an application capable of providing a sponsored service, which is provided by a network operator or a sponsored service operator, may be stored in the network 405.

In operation 440, the network 405 may transmit a verification result to the platform layer 404.

In operation 445, the platform layer 404 may perform a registration process, such as a storage operation, an update operation, or deletion of the application-related information based on the received verification result.

In operation 450, the platform layer 404 may transmit a registration result to the application layer 402.

In operation 455, the application layer 402 may operate according to the received registration result, and may selectively provide information, which is related to the registration result, through a display unit of the UE 401.

As described above, the verification and registration procedures for verifying and registering the downloaded or preloaded sponsored service-related application may be performed.

Information used in the verification procedure may include a service ID of an application, a basic URL for providing a service, a service plan, and token information.

In an embodiment of the present disclosure, the service ID may be selectively stored, and it is desirable that the service ID is stored in the UE 401 and the network 405. By updating the service ID stored in the network 405, the service-related information stored in the UE 401 may be updated through the on-line verification procedure.

In addition, in an embodiment of the present disclosure, the basic URL for providing a service may be selectively stored, and may be included in the verification procedure for providing the service. The sponsored service may be provided even to a page having a particular basic low-level URL, and it is possible to identify a service by using a basic URL.

In addition, in an embodiment of the present disclosure, the service plan may be selectively stored, and may include information related to a scheme for providing a sponsored service. The service plan may be fixed or changed according to a setting by the sponsored service providing operator. Alternatively, the service plan may be implemented to provide all of the services for free, or may be implemented to provide only some of the services for free.

Further, in an embodiment of the present disclosure, the token information may be selectively stored, and may be provided for authentication between the UE and the network in relation to the provision of a sponsored service. The network may also have token-related basic information, and may determine whether a service is verified, by comparing the received token information with the preset token information. In addition, the token information may include valid time information. When the valid time period expires and the token becomes invalid, the UE may receive a token reissued by the sponsored service provider.

Figure 5:
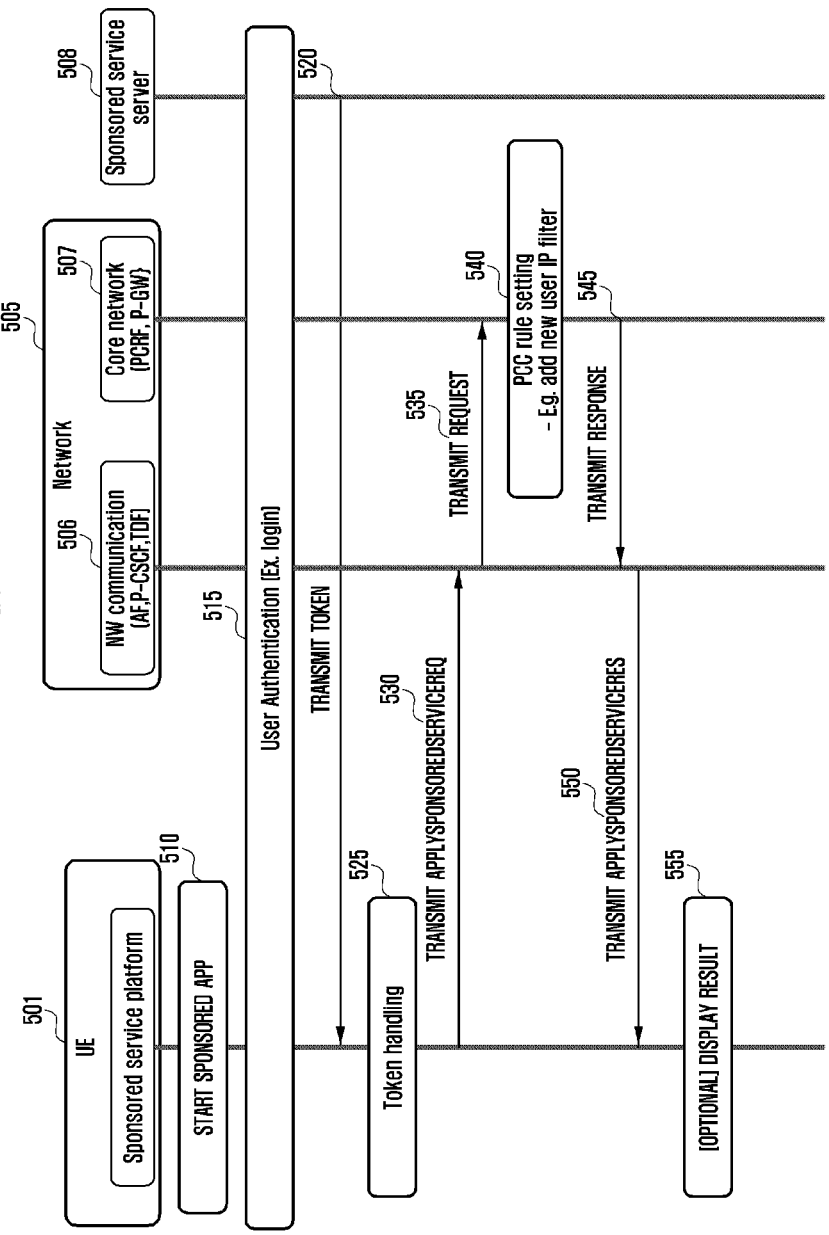
FIG. 5 is a signal flow diagram illustrating a method for applying a sponsored service according to an embodiment of the present disclosure.

FIG. 5 is a signal flow diagram illustrating a method for applying a sponsored service according to an embodiment of the present disclosure.

Referring to FIG. 5, a UE 501 may transmit/receive a signal to/from a network 505. The UE 501 may include a platform layer. In addition, the network 505 may include at least one of a network communication node 506 and a core network 507. More specifically, the network communication node 506 may include at least one of an access function (AF), a proxy call session control function (P-CSCF), and a traffic detection function (TDF).

In operation 510, a sponsored service application may be performed in the UE 501. The sponsored service application may be performed according to a user input or a preset condition.

In operation 515, the UE 501 may perform an authentication procedure with a sponsored service server 508. The authentication procedure may include a login procedure.

When the authentication has been successfully completed, in operation 520, the UE 501 may receive token information required for a sponsored service from the sponsored service server 508. Meanwhile, according to an embodiment of the present disclosure, the pre-stored token may exist in the UE 501, and in this case, an operation of separately receiving the token information may be omitted.

In operation 525, the UE 501 may store information required among pieces of information related to the received token. The token-related information may include a valid time period and information of a token-related sponsored service.

In operation 530, the UE 501 may transmit, to the network communication node 506, a request message for applying a sponsored service.

In operation 535, the network communication node 506 may deliver the request message to the core network 507.

In operation 540, the core network 507 may set a charging-related policy control and charging (PCC) rule based on the received message, and the setting of the PCC rule may include the application of a new IP filter related to traffic of the sponsored service.

In operation 545, the core network 507 may transmit, to the network communication node 506, a response message according to the applied rule.

In operation 550, the network communication node 506 may transmit a sponsored service application response message to the UE 501. The response message may include information related to whether the PCC rule is applied, and may also include new information related to charging designated by the core network.

In operation 555, the UE 501 may display a result of the application to a user based on the received message, and operation 555 may be selectively performed.

In an embodiment of the present disclosure, examples of the method for delivering a message to the core network may include at least one of a method for delivering a message to a P-CSCF through an IP multimedia subsystem (IMS) session initiation protocol (SIP) message, a method for transmitting a message to a TDF through a particular defined data packet, and a method for transmitting a message to an AF-Server by using a standard protocol.

In an embodiment of the present disclosure, when a sponsored service is applied to the network through the process illustrated in FIG. 5 whenever the sponsored application is executed, a token needs to be reissued by the sponsored service server at every time. A validity time period of a token may be set, and thereby a service policy of a token may be maintained without a process for reissuing and delivering the relevant token during the relevant validity time period. In this case, even when the application is performed and causes the UE to access the server, the sponsored service server does not reissue a token, and a token is reissued when a sponsored service policy of the relevant user is changed or when the validity time period of the token expires. In an embodiment of the present disclosure, the UE may store the token, which has once been reissued, and may reuse the token when the need arises. When a token is reissued, the UE may store and use the relevant token. In an embodiment of the present disclosure, when the UE monitors a validity time period of the token and the validity time period of the token expires, the UE may request the relevant sponsored service server to reissue a token.

In an embodiment of the present disclosure, when a sponsored service policy is not changed, or in the case of a service of which security does not matter, the sponsored service server does not issue a token, but the sponsored application may issue a token, or a particular token may be pre-stored in the UE before being used.

Figure 6:
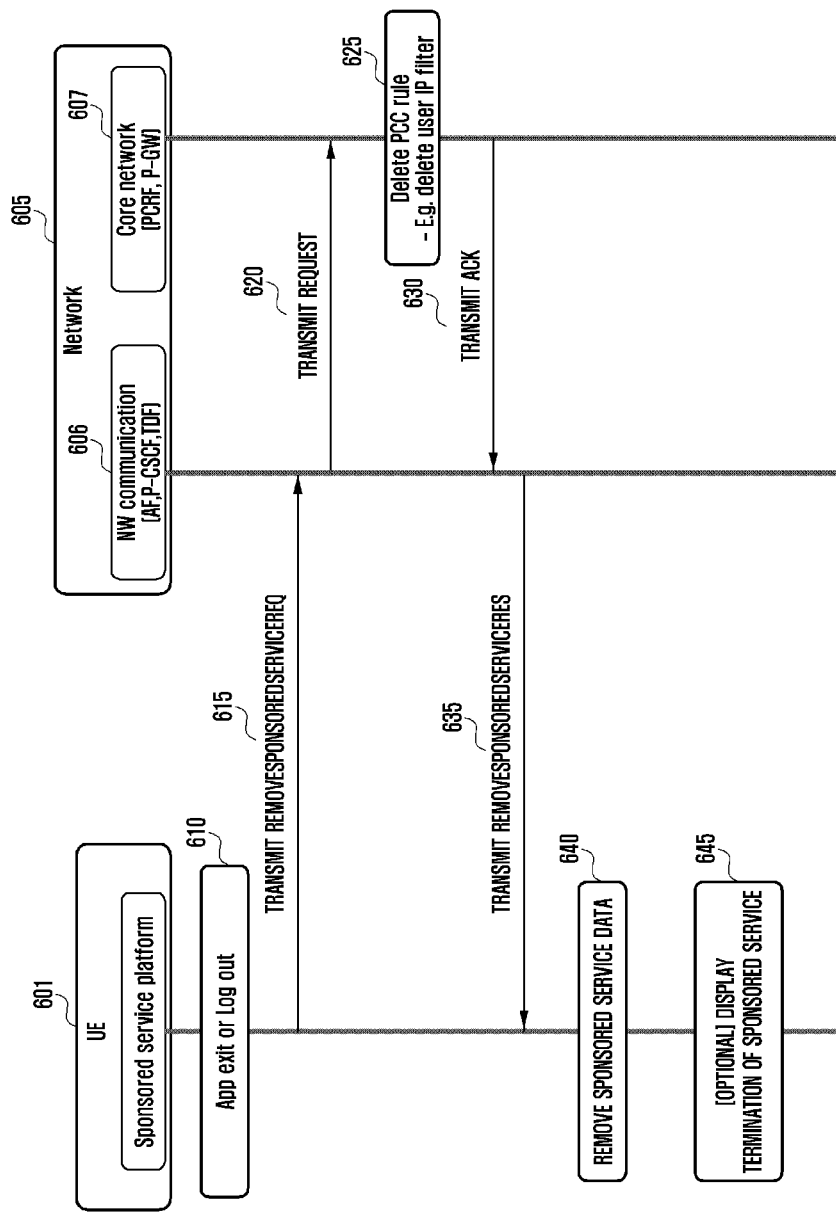
FIG. 6 is a signal flow diagram illustrating a method for stopping an application of a sponsored service according to an embodiment of the present disclosure.

FIG. 6 is a signal flow diagram illustrating a method for stopping an application of a sponsored service according to an embodiment of the present disclosure.

Referring to FIG. 6, a UE 601 may transmit/receive a signal to/from a network 605. The UE 601 may include a platform layer. In addition, the network 605 may include at least one of a network communication node 606 and a core network 607. More specifically, the network communication node 606 may include at least one of an AF, a P-CSCF, and a TDF. In addition, the network communication node 606 may include a node that processes the transmission/reception of traffic and charging. The core network 607 may include at least one of a PCRF and a PGW.

In operation 610, the UE 601 may exit or log out of a sponsored service-related application. This operation may be performed through a user input, or may be performed when a preset condition is satisfied.

In operation 615, the UE 601 may transmit a sponsored service removal request message to the network communication node 606. The request message may include information, which is related to a sponsored service required to be stopped, and information for identifying the UE 601.

In operation 620, the network communication node 606 may deliver the received request message to the core network 607.

In operation 625, the core network 607 may remove a sponsored service-related PCC rule. More specifically, the core network 607 may remove a determined PCC rule based on the received message.

In operation 630, the core network 607 may transmit, to the network communication node 606, response information related to the removal of the PCC rule.

In operation 635, the network communication node 606 may deliver a sponsored service removal response message to the UE 601.

In operation 640, the UE 601 may remove sponsored service-related data based on the received message. In an embodiment of the present disclosure, the UE 601 may remove only some of services related to the sponsored service.

In operation 645, the UE 601 may display the termination of the sponsored service.

In addition, in an embodiment of the present disclosure, when a token for a sponsored service expires, the core network 607 may remove a related PCC rule. Accordingly, the core network 607 may receive token-related information through the message received from the UE 601, and may drive a timer based on the token-related information. In addition, when the token expires, the UE 601 may receive a token reissued by the sponsored service server, or may request the sponsored service server to reissue a token.

In addition, when the UE 601 is detached from the network without exiting or logging out of the sponsored service-related application, the core network 607 may remove a PCC rule related to the UE 601. When the UE 601 is again attached to the network and a sponsored application is executed, the UE 601 may request the server to reissue a token and may receive the reissued token, and may restart a sponsored service. Alternatively, the UE 601 may restart the sponsored service by using a token stored in the UE 601.

In addition, when the access to the network by the UE 601 is abnormally terminated, or when the UE 601 is abnormally powered off, the UE 601 may again deliver token-related information to the network during the execution of a next sponsored application. In addition, the core network 607 may implicitly recognize that the access to the network by the UE 601 has been abnormally terminated. More specifically, when traffic is not received from the UE 601 during a time period exceeding a particular timer value, the PCC rule for the UE 601 may be removed.

Further, when the UE 601 accesses the core network 607 including a PGW through a Wi-Fi network, the UE 601 may provide a user token to the core network 607. At this time, the used token may be identical or different to/from a token in a case where a cellular network is used. More specifically, a wider bandwidth may be allocated to the user, or a longer expiration time period may be brought to a token than in the case where the Wi-Fi network is used. The core network 607 may apply different PCC rules according to a network that the UE 601 accesses.

Figure 7:
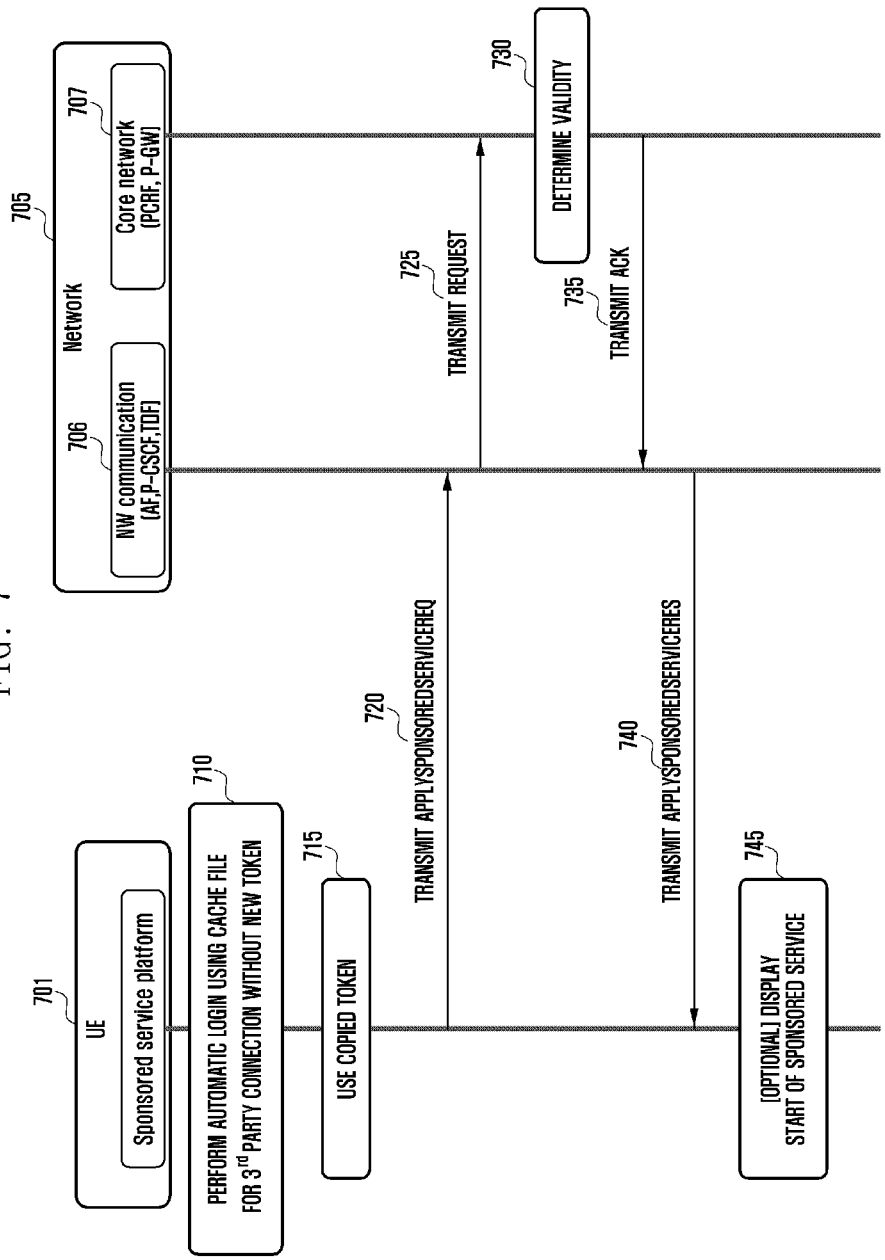
FIG. 7 is a signal flow diagram illustrating a method for exchanging token information for providing a sponsored service according to an embodiment of the present disclosure.

FIG. 7 is a signal flow diagram illustrating a method for exchanging token information for providing a sponsored service according to an embodiment of the present disclosure.

Referring to FIG. 7, the UE 701 may transmit/receive a signal to/from a network 705. The UE 701 may include a platform layer. In addition, the network 705 may include at least one of a network communication node 706 and a core network 707. More specifically, the network communication node 706 may include at least one of an AF, a P-CSCF, and a TDF. The core network 707 may include at least one of a PCRF and a PGW.

In an embodiment of the present disclosure, when a particular sponsored service has a service plan which has a small change or is simple, the UE 701 has a little need to receive a reissued token. In this case, the UE 701 may copy the stored token and may use the copied token. In an embodiment of the present disclosure, examples of a simple service plan may include a case in which services are provided to all users for free and an expiration time period does not exist. A condition, in which the copied token can be used, is pre-designated for both the UE and the network, and thus the copied token may be verified by both the UE and the network.

In operation 710, the UE 701 may have a stored token without accessing the sponsored service server. In addition, according to an embodiment of the present disclosure, a preloaded application may have a stored token as described above.

In operation 715, the UE 701 may copy the stored token and may use the copied token.

In operation 720, the UE 701 may transmit, to the network communication node 706, a service application request message including information on the copied token.

In operation 725, the network communication node 706 may deliver the received request message to the core network 707.

In operation 730, the core network 707 may determine the validity of the token based on the received information. In an embodiment of the present disclosure, when the core network 707 determines the validity of the token and determines that the token is not valid, if information on a result of the determination is delivered to the UE 701, the UE 701 may determine that the token is no longer valid, may access the sponsored service providing server, and may receive a token reissued by the sponsored service providing server. In contrast, when the core network 707 determines that the token is valid, the core network 707 may transmit a response message, which includes the relevant information, to the network communication node 706 in operation 735.

In operation 740, the network communication node 706 may transmit a sponsored service application response message to the UE 701 based on the received message.

In operation 745, the UE 701 may selectively display the start of the sponsored service. In addition, when it is determined as a result of determining the validity that the token is not valid, the UE, which receives the relevant message, may notify the user that the user needs to again access the sponsored service providing server.

Figure 8:
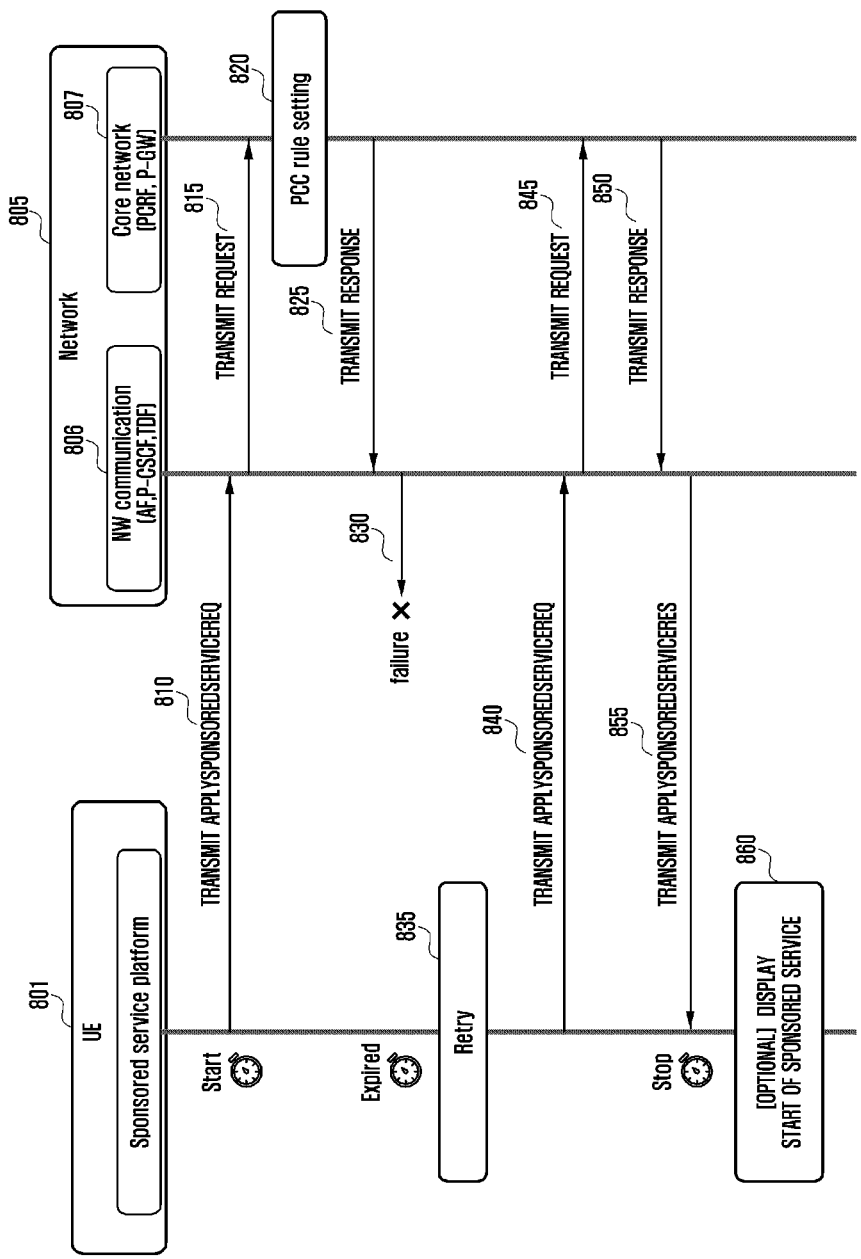
FIG. 8 is a signal flow diagram illustrating a method for processing an error when the error occurs in a sponsored service according to an embodiment of the present disclosure.

FIG. 8 is a signal flow diagram illustrating a method for processing an error when the error occurs in a sponsored service according to an embodiment of the present disclosure.

Referring to FIG. 8, a UE 801 may transmit/receive a signal to/from a network 805. The UE 801 may include a platform layer. In addition, the network 805 may include at least one of a network communication node 806 and a core network 807. More specifically, the network communication node 806 may include at least one of an AF, a P-CSCF, and a TDF. The core network 807 may include at least one of a PCRF and a PGW.

In operation 810, the UE 801 may transmit a sponsored service application request message to the network communication node 806. In addition, the UE 801 may drive a timer having a particular value in response to the transmission of the message.

In operation 815, the network communication node 806, which has received the message, may deliver the received message to the core network 807.

In operation 820, the core network 807 may set a PCC rule related to a sponsored service, that the UE 801 has requested, based on the received information.

In operation 825, the core network 807 may transmit a response message related to the setting of the PCC rule to the network communication node 806.

In operation 830, the network communication node 806 may fail to transmit the message to the UE 801. In an embodiment of the present disclosure, only a case has been described in which the network communication node 806 fails to transmit the message. However, an embodiment of the present disclosure may be similarly applied to a case in which a failure occurs in at least one of operations 810 to 830.

In operation 835, when the timer driven in operation 810 expires and a sponsored service application response message is not received until the timer expires, in operation 840, the UE 801 may retransmit the sponsored service application request message, and in operation 845 to 855, the UE 801 may receive a sponsored service response message. In these operations, the core network 807 may again apply a PCC rule, or may not additionally apply the PCC rule since an already-applied rule exists.

In operation 860, the UE 801 may selectively display related information to the user based on the received message.

Figure 9:
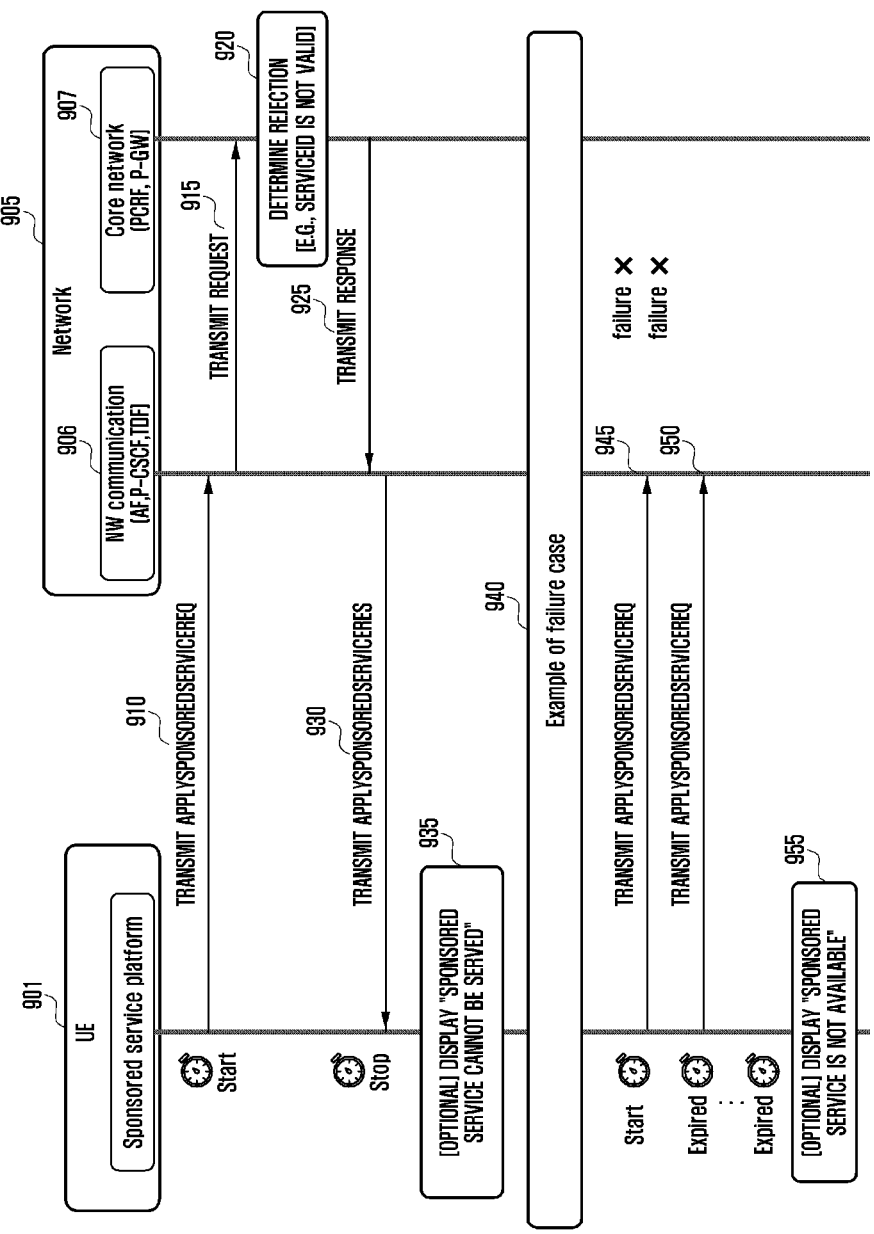
FIG. 9 is a signal flow diagram illustrating a method for processing an error when the error occurs in a sponsored service according to an embodiment of the present disclosure.

FIG. 9 is a signal flow diagram illustrating a method for processing an error when the error occurs in a sponsored service according to an embodiment of the present disclosure.

Referring to FIG. 9, a UE 901 may transmit/receive a signal to/from a network 905. The UE 901 may include a platform layer. In addition, the network 905 may include at least one of a network communication node 906 and a core network 907. More specifically, the network communication node 906 may include at least one of an AF, a P-CSCF, and a TDF. The core network 907 may include at least one of a PCRF and a PGW.

Operations 910 to 935 represent a process in a case where the UE 901 receives a rejection response to a sponsored service request.

In operation 910, the UE 901 may transmit a sponsored service application request message to the network communication node 906. In addition, the UE 901 may drive a timer having a particular value in response to the transmission of the message.

In operation 915, the network communication node 906, which has received the message, may deliver the received message to the core network 907.

In operation 920, the core network 907 may determine whether a PCC rule is applied, based on the received information. In an embodiment of the present disclosure, the core network 907 may determine that the information transmitted by the UE 901 is not valid, and may transmit a service rejection response. In an embodiment of the present disclosure, examples of the cause of service rejection may include the expiration of a token and a case in which a service ID is not valid.

In operation 925, the core network 907 may transmit a response message related to the service rejection to the network communication node 906.

In operation 930, the network communication node 906 may transmit the message to the UE 901.

In operation 935, the UE 901 may stop the driven timer in response to the received message, and may provide the user with information representing that the sponsored service cannot be provided.

In an embodiment of the present disclosure, examples of a case where the core network 907 rejects the request of the UE 901 may include a case where a sponsored application is not valid, a case where it is impossible to currently provide a service, and a case where a condition usable by the UE 901 is not satisfied.

In this embodiment of the present disclosure, operations after an operation indicated reference numeral 940 represent a case in which access fails.

In operation 945, the UE 901 may transmit a sponsored service application request message to the network communication node 906. In addition, the UE 901 may drive a timer having a particular value in response to the transmission of the message.

When the network communication node 906 does not respond to the sponsored service application request message until a particular timer value exceeds, in operation 950, the UE 901 may retransmit the sponsored service application request message to the network communication node 906.

Thereafter, when the UE 901 does not receive a separate response until the timer value expires, in operation 955, the UE 901 may provide the user with information representing that the sponsored service is not available.

Figure 10:
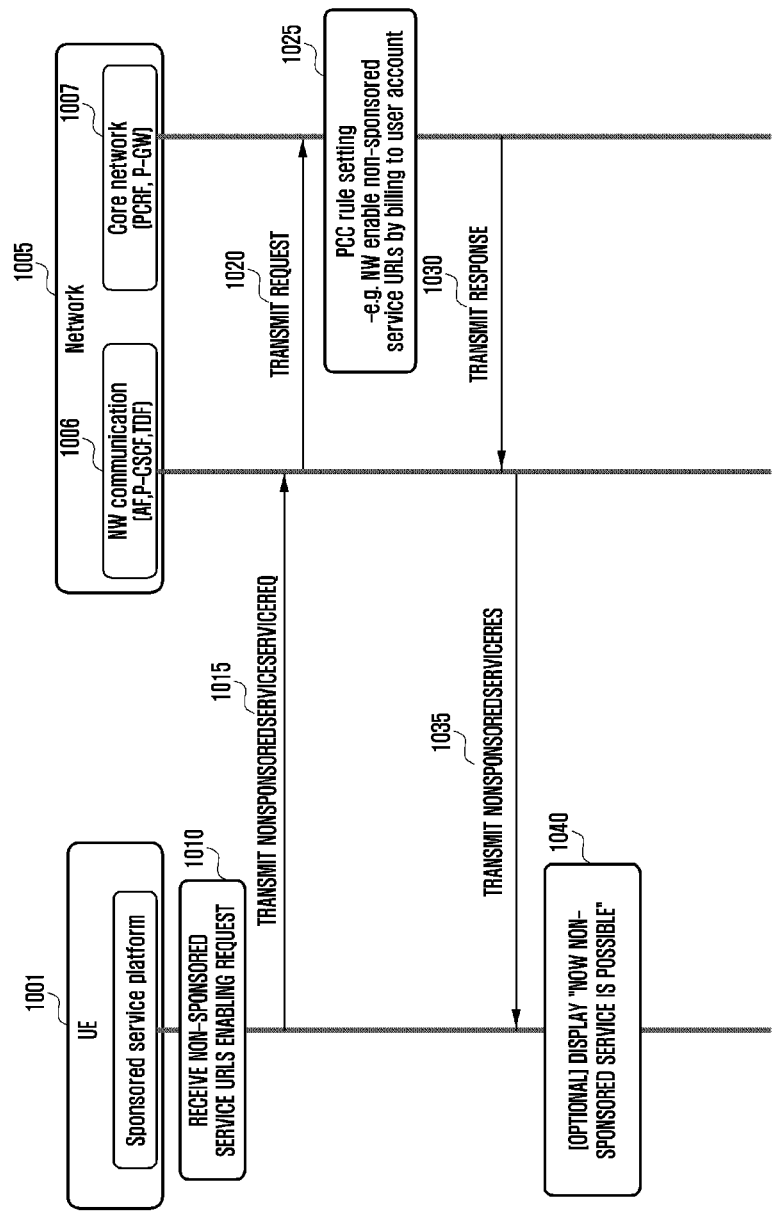
FIG. 10 is a signal flow diagram illustrating a method for enabling a non-sponsored general service to be provided when a sponsored service is provided according to an embodiment of the present disclosure.

FIG. 10 is a signal flow diagram illustrating a method for enabling a non-sponsored service to be provided when a sponsored service is provided according to an embodiment of the present disclosure.

Referring to FIG. 10, a UE 1001 may transmit/receive a signal to/from a network 1005. The UE 1001 may include a platform layer. In addition, the network 1005 may include at least one of a network communication node 1006 and a core network 1007. More specifically, the network communication node 1006 may include at least one of an AF, a P-CSCF, and a TDF. The core network 1007 may include at least one of a PCRF and a PGW.

In an embodiment of the present disclosure, the UE 1001 may determine whether an application providing a sponsored service allows traffic which is not a non-sponsored service or which can be charged. More specifically, when the application providing the sponsored service provides a non-sponsored external link, or when the sponsored service coexists with the non-sponsored service in the relevant application and the user uses the non-sponsored service, the sponsored service may not be provided in the case of traffic related to the relevant link. Accordingly, the user may determine whether the user is to use a relevant service even when the relevant service is charged.

To this end, the UE may provide the user with a menu for setting whether the non-sponsored service is used through the sponsored application. When the user selects an option using a data rate plan of the user with respect to the relevant non-sponsored service, the user may use all the applications and services. When the user sets the non-sponsored service through the sponsored application not to be used, the UE may detect a request for using the non-sponsored service and enables the relevant service not to be performed. In addition, the UE may notify the user of the relevant information.

In an embodiment of the present disclosure, the UE may detect a request for using the non-sponsored service, may notify the user of the detection of the request, and enables the user to select whether the user uses the relevant service. In addition, according to the user's selection, the UE may perform or may not perform the relevant service.

The network may be set to distinguish sponsored traffic from non-sponsored traffic with respect to traffic using a sponsored service APN and to block the non-sponsored traffic or to charge for the non-sponsored traffic by using the user's rates. When the network is set to block the non-sponsored traffic, if the user intends to use the relevant service by using a data plan of the user, the UE may notify the network of the user's intention as illustrated in FIG. 10, the relevant service may be allowed, and the user may be charged for the relevant service. When the network is set to charge for the non-sponsored traffic by using the user's rates, if the user refuses to use the relevant service, the UE needs to block the relevant service. When the user intends to use the relevant service, the network side may distinguish the sponsored service from the non-sponsored service without an additional process between the UE and the network, and may separately charge for the sponsored service and the non-sponsored service.

FIG. 10 illustrates operations of the UE and the network side in a case where the user intends to use a sponsored service by using a data plan of the user when the network side is set to block a non-sponsored service.

In operation 1010, the UE 1001 may receive a non-sponsored service enabling request from the user. The non-sponsored service enabling request may be provided by a separate setting provided to the UE 1001, and such a setting may be applied to the entire UE 1001, or may be applied for each sponsored service application. In addition, the user may select one of different selected settings, such as a selected setting which is applied only once and another selected setting which is continuously applied. In an embodiment of the present disclosure, the UE 1001 may monitor a domain name system (DNS) query message of a sponsored application, may compare the DNS query message with a sponsored URL list, and may detect a non-sponsored link or a non-sponsored service request.

In operation 1015, the UE 1001 may transmit a non-sponsored service request message to the network communication node 1006. The request message may include target sponsored service information, information on the type of non-sponsored service capable of being requested, and information on a service plan.

In operation 1020, the network communication node 1006 may deliver the received message to the core network 1007.

In operation 1025, the core network 1007 may set a PCC rule for the UE 1001 based on the received message. More specifically, the core network 1007 may cause traffic of a non-sponsored service, which occurs in a sponsored service requested by the user, to be allowed, and according to an embodiment of the present disclosure, may charge the UE 1001 for traffic generated due to the non-sponsored service.

In operation 1030, the core network 1007 may deliver a response message, which includes information related to the application of the PCC rule, to the network communication node 1006.

In operation 1035, the network communication node 1006 may deliver a non-sponsored service response message to the UE 1001 based on the received message.

In operation 1040, the UE 1001 may selectively provide the user with information representing that the non-sponsored service is possible based on the received message.

In a subsequent operation, the user may transmit/receive traffic of the non-sponsored service through the sponsored service application, for which the non-sponsored service is allowed, and may charge the user for the transmission/reception of the traffic of the non-sponsored service.

Figure 11:
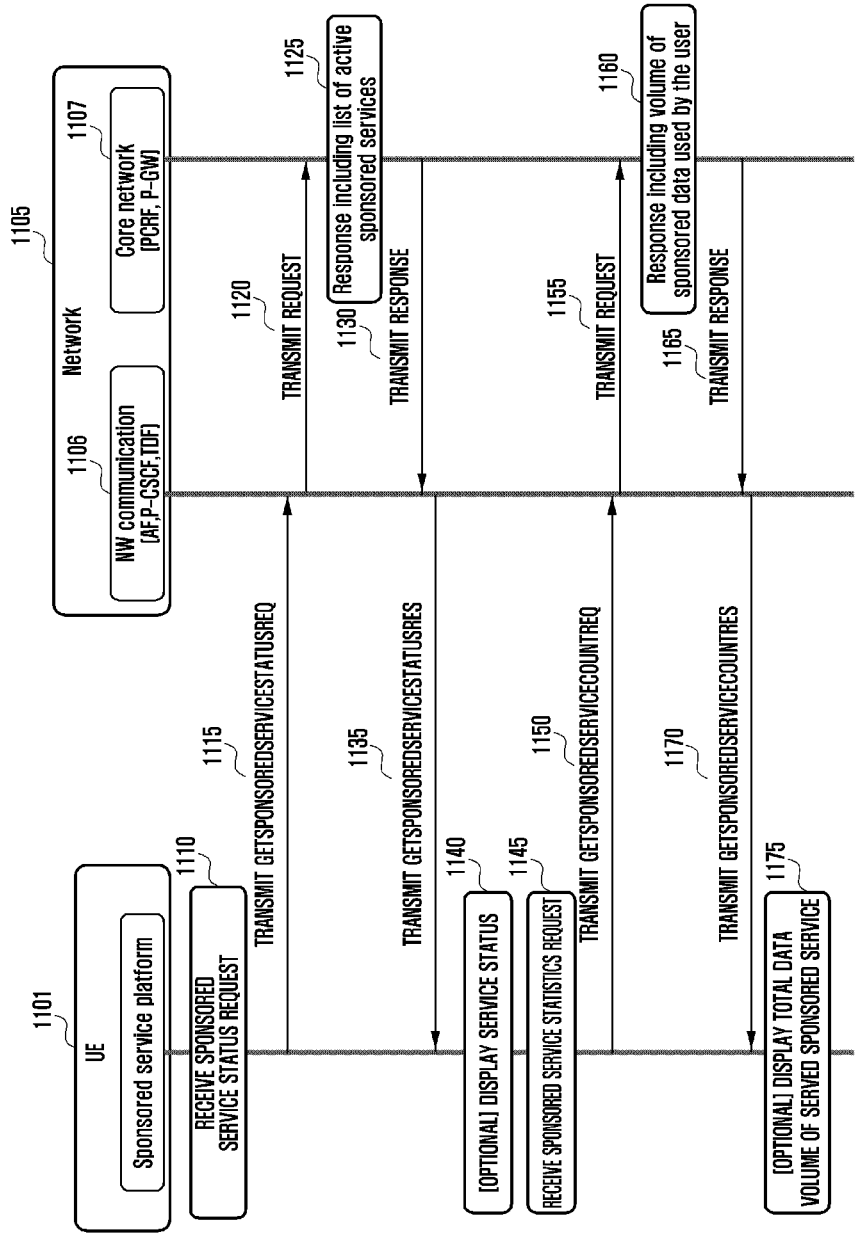
FIG. 11 is a signal flow diagram illustrating a method for transmitting/receiving sponsored service-related information and the possible amount of service provision according to an embodiment of the present disclosure.

FIG. 11 is a signal flow diagram illustrating a method for transmitting/receiving sponsored service-related information and the possible amount of service provision according to an embodiment of the present disclosure.

Referring to FIG. 11, a UE 1101 may transmit/receive a signal to/from a network 1105. The UE 1101 may include a platform layer. In addition, the network 1105 may include at least one of a network communication node 1106 and a core network 1107. More specifically, the network communication node 1106 may include at least one of an AF, a P-CSCF, and a TDF. The core network 1107 may include at least one of a PCRF and a PGW.

In operation 1110, the UE 1101 may receive a sponsored service status request. In an embodiment of the present disclosure, the status request may include information related to a list of currently active sponsored services.

In operation 1115, the UE 1101 may transmit a sponsored service status request message to the network communication node 1105 according to the received status request. The status request message may include a message which requests sponsored service-related information, and more specifically, may include a message which requests information related to a sponsored service which is currently active in the core network 1107.

In operation 1120, the network communication node 1106 may deliver information, which is included in the received message, to the core network 1107.

In operation 1125, the core network 1106 may generate a message including corresponding information based on the received information. More specifically, the corresponding information may include a list of the currently active sponsored services.

In operation 1130, the core network 1107 may transmit a response message, which includes the corresponding information, to the network communication node 1106.

In operation 1135, the network communication node 1106 may transmit a sponsored service status response message to the UE 1101 based on the received message.

In operation 1140, the UE 1101 may selectively display a service status to the user based on the received message.

In operation 1145, the UE 1101 may receive a sponsored service statistics request. In an embodiment of the present disclosure, the statistics request may include at least one piece of information among information on sponsored service-related usable volume and information on sponsored service-related used volume.

In operation 1150, the UE 1101 may transmit a sponsored service statistics request message to the network communication node 1105 according to the received statistics request. The statistics request message may include a message which requests sponsored service-related information, and more specifically, may include a message which requests at least one piece of information among information on current sponsored service-related usable volume and information on current sponsored service-related used volume.

In operation 1155, the network communication node 1106 may deliver information, which is included in the received message, to the core network 1107.

In operation 1160, the core network 1106 may generate a message including corresponding information based on the received information. More specifically, the corresponding information may include at least one of sponsored service usable traffic volume, which can be used by the UE 1101, and sponsored service-related traffic volume which has already been used.

In operation 1165, the core network 1107 may transmit a response message, which includes the corresponding information, to the network communication node 1106.

In operation 1170, the network communication node 1106 may transmit a sponsored service statistics response message to the UE 1101 based on the received message.

In operation 1175, the UE 1101 may selectively display service statistics to the user based on the received message.

Figure 12:
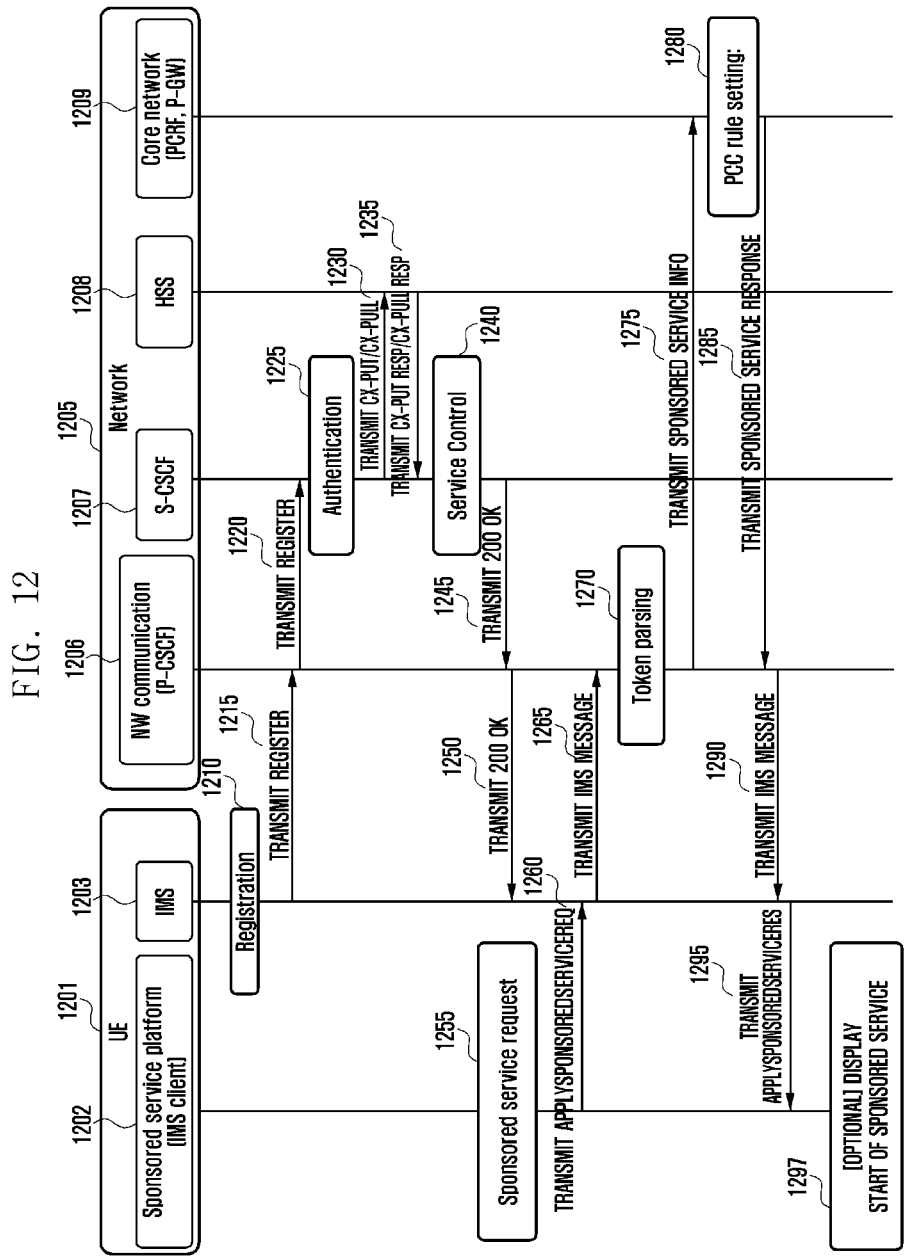
FIG. 12 is a signal flow diagram illustrating a method for delivering sponsored service-related information to a network according to an embodiment of the present disclosure.

FIG. 12 is a signal flow diagram illustrating a method for delivering sponsored service-related information to a network according to an embodiment of the present disclosure. More specifically, FIG. 12 is a signal flow diagram illustrating the method capable of transmitting sponsored service-related information to a core network 1209. Referring to FIG. 12, a UE 1201 may deliver sponsored service-related information to the core network 1209 through an IMS message.

Referring to FIG. 12, the UE 1201 may transmit/receive a signal to/from a network 1205. The UE 1201 may include a platform layer 1202 and an IMS layer 1203. In addition, the network 1205 may include at least one of a network communication node 1206, a serving CSCF (S-CSCF) 1207, a home subscriber server (HSS) 1208, and the core network 1209. More specifically, the network communication node 1206 may include a P-CSCF. The core network 1209 may include at least one of a PCRF and a PGW.

Operations 1210 to 1250 represent a process related to a method for performing an IMS registration by the UE 1201.

In operation 1210, the IMS layer 1203 may perform a procedure for registering a network.

In operation 1215, the IMS layer 1203 may transmit a message for registration to the network communication node 1206. The message for registration may include identifier information of the UE 1201 for registration.

In operation 1220, the network communication node 1206 may deliver a message to the S-CSCF 1207.

In operation 1225, the S-CSCF 1207 may perform a procedure for registration based on the received message. To this end, the S-CSCF 1207 may selectively transmit/receive a signal to/from the HSS 1208.

In operations 1230 and 1235, in order to transmit a request for subscriber information to the HSS 1208, the S-CSCF 1207 may transmit a Cx-put/Cx-pull message to the HSS 1208, and may receive a response message from the HSS 1208 in response to the Cx-put/Cx-pull message.

In operation 1235, the S-CSCF 1207 may perform service control based on at least one of the received messages.

When the service control is successfully performed, in operation 1240, the S-CSCF 1207 may transmit a 200 OK message to the network communication node 1206 in operation 1245. In operation 1250, the network communication node 1206 may transmit the 200 OK message to the IMS layer 1203. The UE 1201 may transmit/receive a signal to/from the core network 1209 through an IMS message. More specifically, the network communication node 1206 may transmit the IMS message, which includes particular information, to the core network 1209.

In operation 1255, the platform layer 1202 may start a sponsored service.

In operation 1260, the platform layer 1202 may transmit a sponsored service application request message to the IMS layer 1203. The sponsored service application request message may include contents corresponding to the transmitted message in operation 530.

In operation 1265, the IMS layer 1203 may transmit an IMS message, which is generated based on the received message, to the network communication node 1206.

In operation 1270, the network communication node 1206 may parse the received token information, and may determine whether sponsored service-related information needs to be transmitted to the core network 1209, based on a result of parsing the received token information.

In operation 1275, the network communication node 1206 may transmit a sponsored service application response message to the UE 1209 based on the received message.

In operation 1280, the core network 1209 may apply a sponsored service-related PCC rule based on the received information.

In operation 1285, the core network 1209 may transmit a sponsored service response message, which includes information related to the application of the PCC rule, to the network communication node 1206.

In operation 1290, the network communication node 1206 may deliver the received message to the IMS layer 1203 through an IMS message.

In operation 1295, the IMS layer 1203 may transmit a sponsored service response message, which is included in the received message, to the platform layer 1202. In operation 1297, the platform layer 1202 may selectively display the start of the sponsored service to the user based on the received message.

Figure 13:
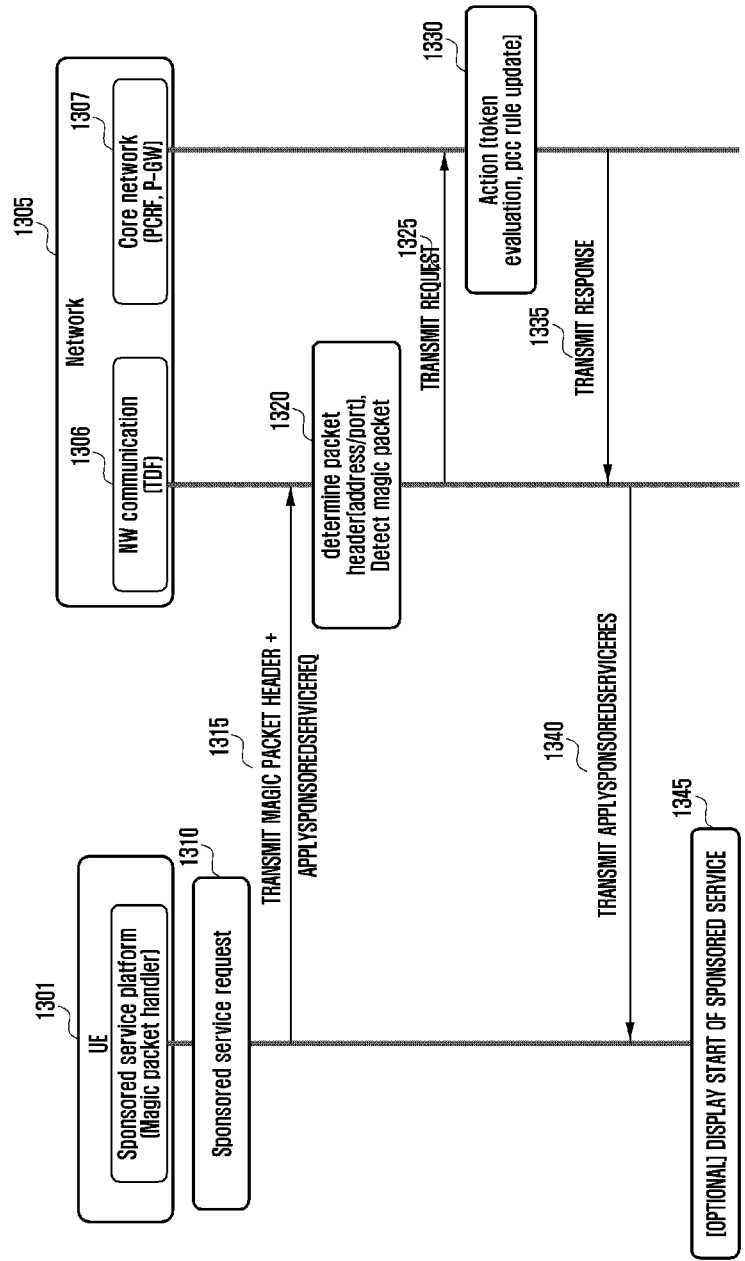
FIG. 13 is a signal flow diagram illustrating a method for delivering sponsored service-related information to a network according to an embodiment of the present disclosure.

FIG. 13 is a signal flow diagram illustrating a method for delivering sponsored service-related information to a network according to an embodiment of the present disclosure.

More specifically, FIG. 13 is a signal flow diagram illustrating the method capable of transmitting sponsored service-related information to a core network 1307. In FIG. 13, particular information may be included in a header of a data packet, the header of the data packet including the particular information may be transmitted to a network communication node 1306, and the network communication node 1306 may deliver the sponsored service-related information to the core network 1307 based on the particular information.

Referring to FIG. 13, a UE 1301 may transmit/receive a signal to/from a network 1305. The UE 1301 may include a platform layer. In addition, the network 1305 may include at least one of the network communication node 1306 and the core network 1307. More specifically, the network communication node 1306 may include at least one of a P-CSCF and a TDF. The core network 1307 may include at least one of a PCRF and a PGW.

In operation 1310, the UE 1301 may start a procedure related to the application of a sponsored service.

In operation 1315, the UE 1301 may transmit a sponsored service application request message to the network communication node 1306. When the UE 1301 transmits the message, the UE 1301 may include a particular value in a packet header and may represent that the transmitted message is a sponsored service-related message. More specifically, in order to transmit information to the core network 1307, the UE 1301 may include a particular address or a particular port value in the packet header.

In operation 1320, the network communication node 1306 may determine the value of the packet header based on the received message, and may determine whether a message needs to be transmitted to the core network 1307, based on a result of the determination.

In operation 1325, when the network communication node 1306 needs to transmit the message to the core network 1307 based on the received message, the network communication node 1306 may transmit information, which is included in the relevant message, to the core network 1307.

In operation 1330, based on the received message, the core network 1306 may cause a token to be valid based on information existing in the token, and may apply a PCC rule.

Operations 1335 to 1345 may correspond to operations 545 to 555, respectively.

Figure 14:
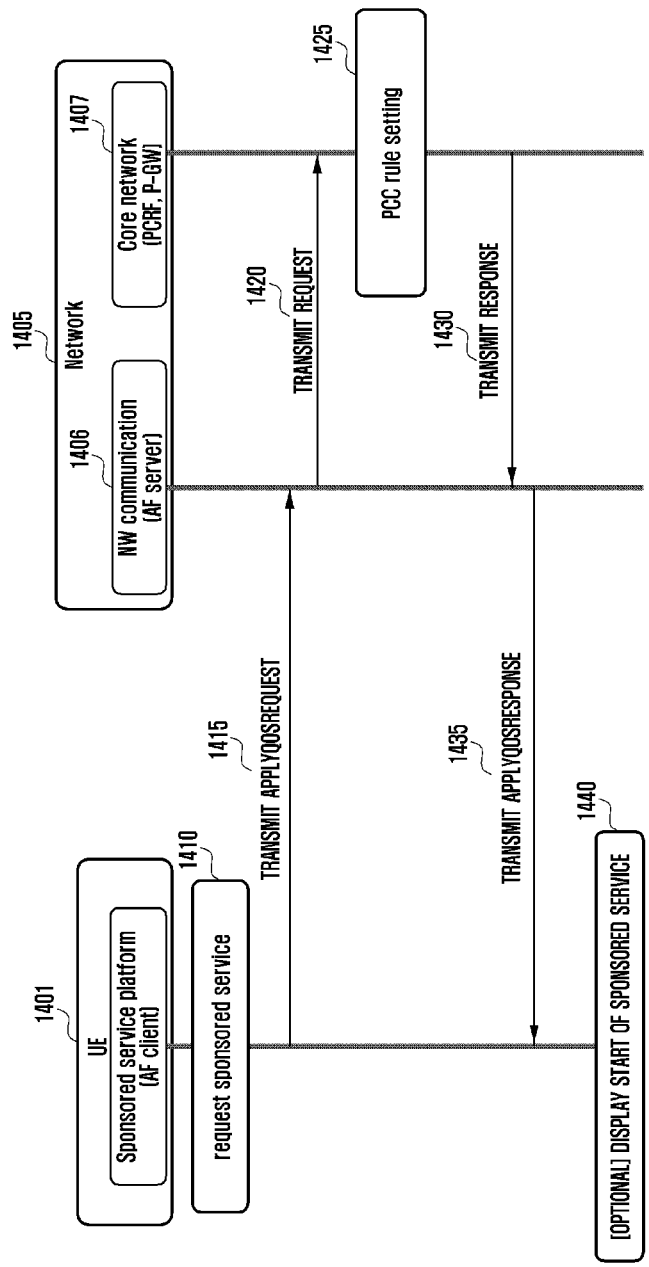
FIG. 14 is a signal flow diagram illustrating a method for delivering sponsored service-related information to a network according to an embodiment of the present disclosure.

FIG. 14 is a signal flow diagram illustrating a method for delivering sponsored service-related information to a network according to an embodiment of the present disclosure.

Referring to FIG. 14, a UE 1401 may transmit/receive a signal to/from a network 1405. The UE 1401 may include a platform layer. In addition, the network 1405 may include at least one of a network communication node 1406 and a core network 1407. More specifically, the network communication node 1406 may include an AF. The core network 1407 may include at least one of a PCRF and a PGW.

In operation 1410, the UE 1401 may start a procedure related to the application of a sponsored service.

In operation 1415, the UE 1401 may transmit a sponsored service application request message to the network communication node 1406. More specifically, the UE 1401 may transmit sponsored service-related information by using a quality of service (QoS) application request message.

In operation 1420, the network communication node 1406 may determine whether information included in the received message needs to be delivered to the core network 1407, based on the received message.

In operation 1425, based on the received message, the core network 1407 may cause a token to be valid based on information existing in the token, and may apply a PCC rule.

Operations 1430 to 1440 may correspond to operations 545 to 555, respectively.

Figure 15A:
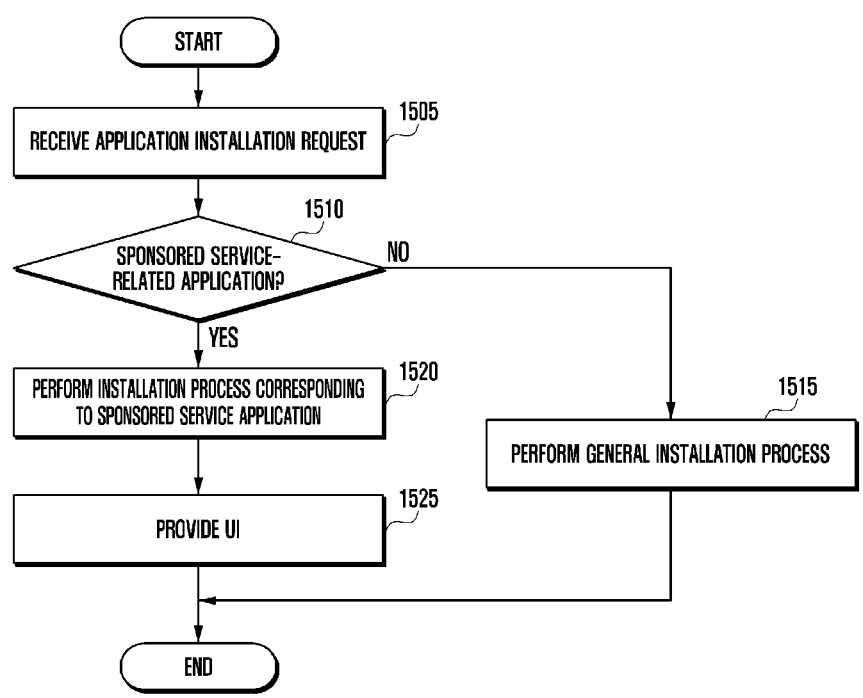
FIG. 15A is a flowchart illustrating a method for installing an application for providing a sponsored service on a user equipment (UE) according to an embodiment of the present disclosure.
Figure 15B:
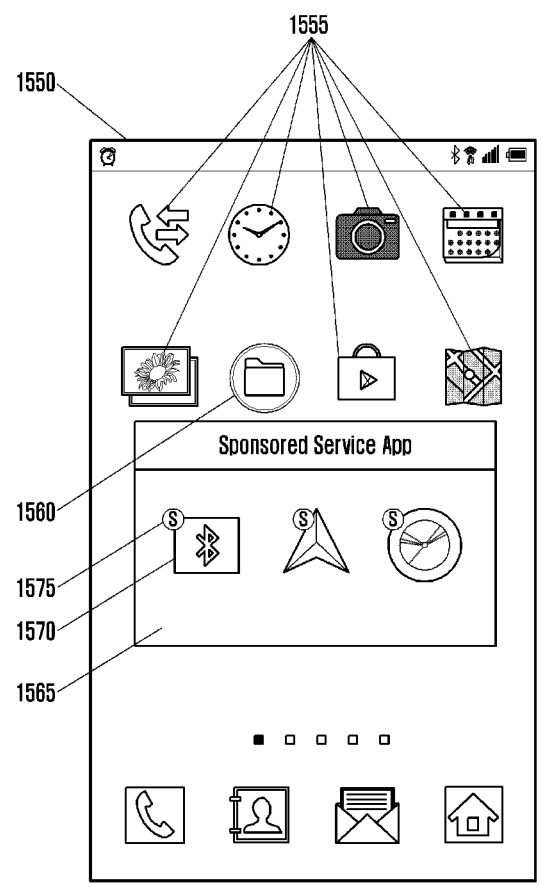
FIG. 15B illustrates a user interface (UI) provided when an application for providing a sponsored service is installed on a UE according to an embodiment of the present disclosure.

FIG. 15A is a flowchart illustrating a method for installing an application for providing a sponsored service on a UE according to an embodiment of the present disclosure. FIG. 15B illustrates a user interface (UI) provided when an application for providing a sponsored service is installed on a UE according to an embodiment of the present disclosure.

Referring to FIGS. 15A and 15B, the UE may include a display unit 1550.

In operation 1505, the UE may receive an application installation request. More specifically, the application installation request may be downloaded through an application store and the like, may be installed through a downloaded installation file, or may be installed through over the air (OTA).

In operation 1510, the UE may determine whether an application to be installed is a sponsored service-related application. More specifically, the UE may confirm a service ID of the application to be installed, and the UE may determine whether the application to be installed is a sponsored service-related application, based on a result of the confirmation. In addition, when the application is downloaded through an application store and the like, the UE may receive a separate indicator representing a sponsored service-related application from the application store, and may determine that the application to be installed corresponds to a sponsored service, based on the separate indicator. In addition, information capable of distinguishing a sponsored service-related application may be preset for the UE, or may be continuously updated and stored in the UE. Further, when a particular character string is included in the service ID, the UE may determine whether the application to be installed is a sponsored service-related application, based on the particular character string.

When the application to be installed is not a sponsored service-related application, in operation 1515, a general installation process may be performed.

When the application to be installed is a sponsored service-related application, in operation 1520, the UE may perform an installation process corresponding to the sponsored service application. More particularly, the installation process may include disposition of a sponsored service-related icon at a particular location. More specifically, when the application to be installed is a sponsored service-related application, the UE may dispose an execution icon at a particular location, and the particular location may correspond to a folder capable of collecting and displaying multiple execution icons.

In operation 1525, the UE may provide a UI related to the installed sponsored application. Operation 1525 may be selectively executed, and may provide a UI that displays a sponsored icon disposed at the installation location.

More specifically, referring to FIG. 15B, at least one typical folder 1555, which collects and displays general application-related icons, may be displayed. In addition, a sponsored service application-related folder 1560, which collects and disposes sponsored service-related icons, may be displayed. In this case, a sponsored service-related application may be disposed in the sponsored service application-related folder 1560. When a new application is installed, if the relevant application is a sponsored service-related application, the relevant application may be disposed at an inner part 1565 of the folder. Through disposing the sponsored service-related applications as described above, the user can integrally manage the sponsored service-related applications.

Although an embodiment of the present disclosure proposes the disposition of an icon at the inner part of the folder, an icon corresponding to the sponsored service-related application may be disposed in a particular window which is not a folder.

In addition, according to an embodiment of the present disclosure, in the case of an icon 1570 of the sponsored service-related application, the UE may additionally display a particular UI 1575. Through displaying the particular UI 1575 as described above, the user can easily distinguish a general application from a sponsored service-related application.

Figure 16A:
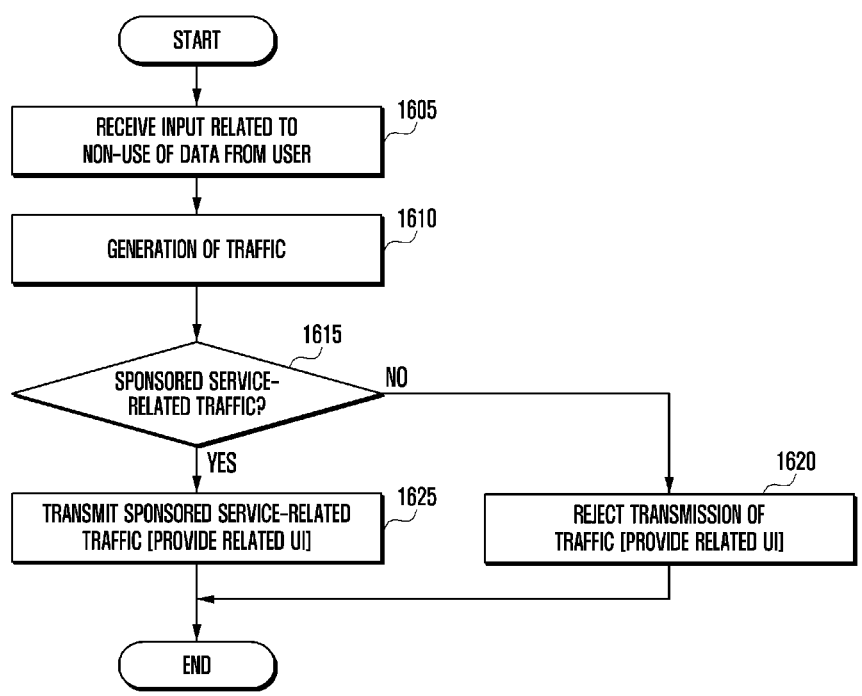
FIG. 16A is a flowchart illustrating a method for providing a sponsored service according to a user's setting in a UE according to an embodiment of the present disclosure.
Figure 16B:
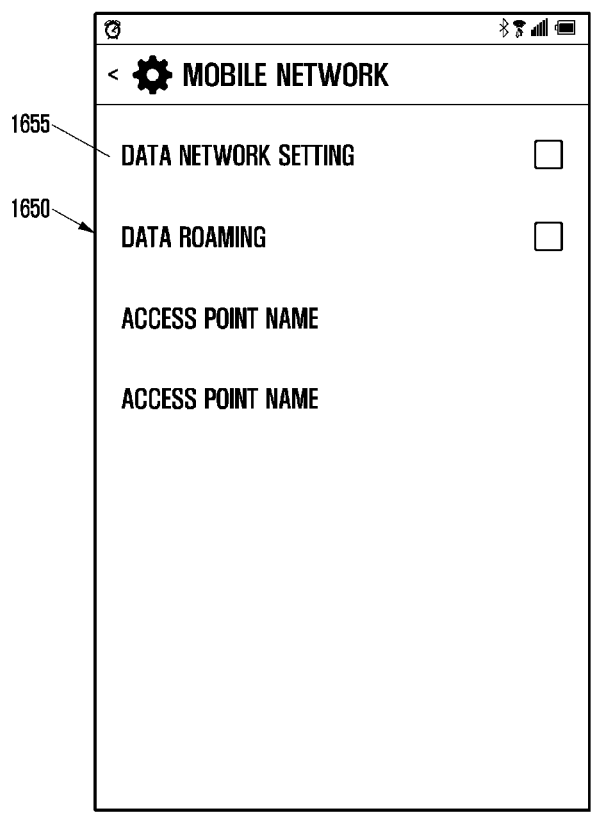
FIGS. 16B and 16C illustrate a UI displayed in order to provide a sponsored service according to a user's setting in a UE according to an embodiment of the present disclosure.
Figure 16C:
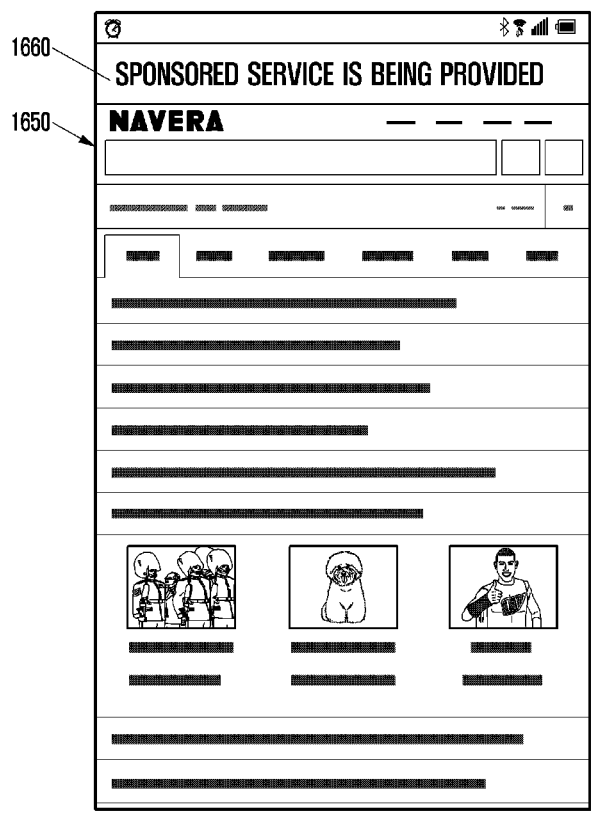

FIG. 16A is a flowchart illustrating a method for providing a sponsored service according to a user's setting in a UE according to an embodiment of the present disclosure. FIGS. 16B and 16C illustrates a UI displayed in order to provide a sponsored service according to a user's setting in a UE according to an embodiment of the present disclosure.

Referring to FIGS. 16A, 16B, and 16C, even when a setting does not allow the UE to access a data network, the UE may transmit/receive sponsored service-related data. More specifically, even when the user inputs, to the UE, a setting which does not allow access to the data network due to a certain active operation, such as a charging operation, and the like, the user may not be charged for a service related to the sponsored service, and thus the UE equipment may transmit/receive the above-described traffic. Alternatively, when the above-described traffic has been generated, if the user does not allow access to the data network and the UE cannot access the data network, it is possible to induce the user to allow the UE to access the data network. In addition, such a configuration may be applied to not only the user's setting but also a case where the UE is a subscriber that is subscribing to only a service related to a voice telephone call and cannot use data, or a case where the user uses up the allowed wireless data and can no longer use wireless data.

In an embodiment of the present disclosure, the network typically determines whether data communication is allowed, based on a rate system plan of the user. When a separate APN is set for a sponsored service and a sponsored application uses the relevant APN, the network may distinguish general traffic from sponsored traffic by using the relevant APN, and even the user, who is not allowed to perform data communication, may be allowed to use a sponsored service which enables the user to access the network by using the relevant APN.

In operation 1605, the UE may receive an input related to the non-use of data. In addition, operation 1605 may not only be applied to the user's setting, but may also be similarly applied to a case where a preset condition is satisfied, or a case where the user subscribes to a service for a voice telephone call and transmission/reception of only a short message service (SMS) message. Here, examples of the case where the preset condition is satisfied may include a case where the UE uses traffic greater than or equal to the preset traffic.

In operation 1610, traffic may be generated by the UE.

In operation 1615, the UE may determine whether the generated traffic is sponsored service-related traffic. More specifically, the UE may determine whether an application, which has generated the traffic, is a sponsored service-related application.

When the generated traffic is not sponsored service-related traffic, in operation 1620, the UE may reject the transmission of the traffic. In addition, when there is the reception of traffic, the UE may reject even the reception of traffic. Further, the UE may selectively provide the user with a UI such that the generated traffic is not sponsored service-related traffic and thus the generated traffic may not be transmitted.

In contrast, when the generated traffic is sponsored service-related traffic, in operation 1625, the UE may transmit/receive the relevant traffic. In addition, the UE may selectively provide the user with a UI representing that the relevant traffic is traffic related to a sponsored service application.

Referring to FIG. 16B, the user may set whether the UE uses data, through a display unit 1650 of the UE. More specifically, the user may disable a relevant setting 1655, and thereby may prevent the UE from transmitting/receiving data.

In a situation where the UE is prevented from transmitting/receiving data as described above, the UE may prevent the transmission/reception of traffic related to a general application, and the UE may provide the user with a UI 1660 representing that the relevant application transmits/receives traffic through a sponsored service, when an operation of generating traffic related to the sponsored service is executed.

Figure 17:
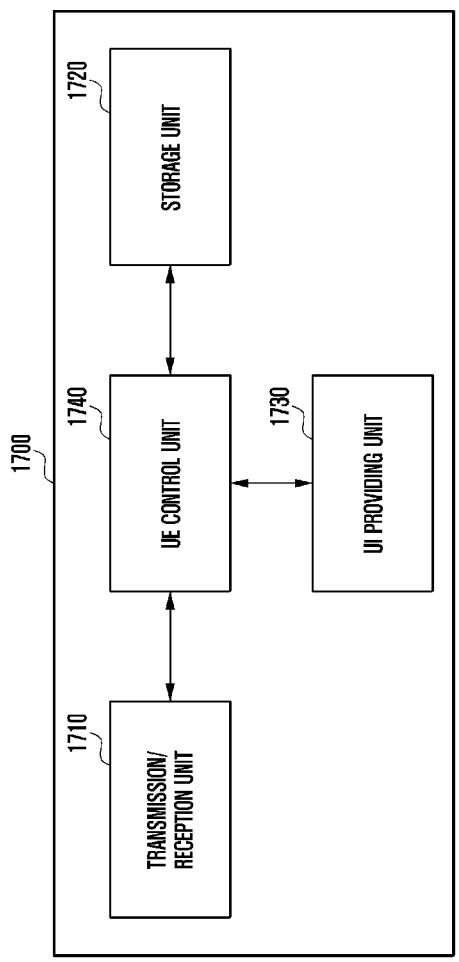
FIG. 17 is a block diagram illustrating a configuration of a UE according to an embodiment of the present disclosure.

FIG. 17 is a block diagram illustrating a configuration of a UE according to an embodiment of the present disclosure.

Referring to FIG. 17, a UE 1700 may include at least one of a transmission/reception unit 1710, a storage unit 1720, a UI providing unit 1730, and a control unit 1740.

According to an embodiment of the present disclosure, the transmission/reception unit 1710 may transmit/receive a signal to/from a node of a network including a base station.

According to an embodiment of the present disclosure, the storage unit 1720 may store information required for an operation of the UE 1700. In addition, the storage unit 1720 may store at least one of data transmitted/received by the transmission/reception unit 1710, and may store information related to the operations of the UE 1700 which have been described in an embodiment of the present disclosure.

According to an embodiment of the present disclosure, the UI providing unit 1730 may deliver information to the user. More specifically, the UI providing unit 1730 may include a display unit for displaying information, a speaker for outputting a sound, a vibration output unit for outputting vibration, and the like, and may employ a method of the related art capable of delivering information to the user. In addition, the UI providing unit 1730 may include a method for providing information to the user which is described in another embodiment of the present disclosure.

According to an embodiment of the present disclosure, the control unit 1740 may control an overall operation of the UE 1700. More specifically, the control unit 1740 may control the overall operation of the UE 1700, which is described in another embodiment of the present disclosure, and may make a determination based on at least one piece of information among information transmitted/received by the transmission/reception unit 1710 and information stored in the storage unit 1720, may generate a message based on a result of the determination, and may cause transmission/reception to be performed by using the generated message.

Figure 18:
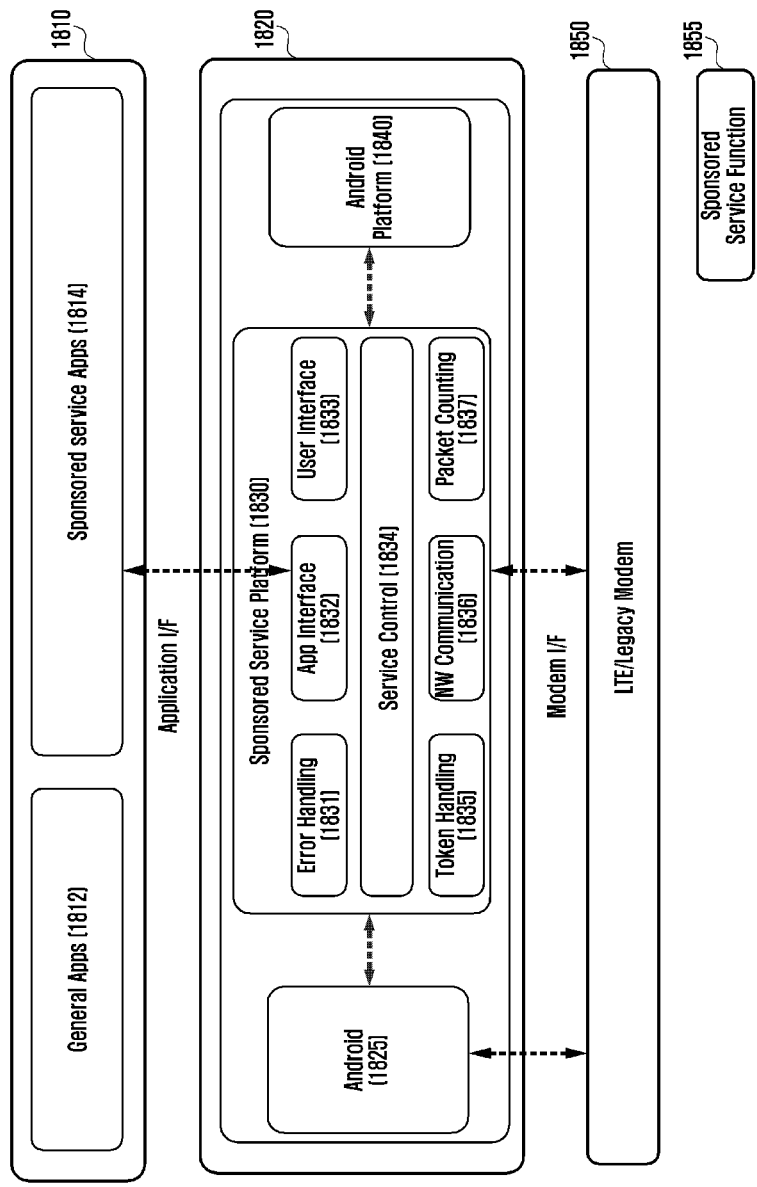
FIG. 18 is a block diagram illustrating a UE according to an embodiment of the present disclosure.

FIG. 18 is a block diagram illustrating a UE according to an embodiment of the present disclosure.

Referring to FIG. 18, the UE, according to an embodiment of the present disclosure, may include at least one of an application layer 1810, a platform layer 1820, and a modem layer 1850. In addition, the UE may include a separate sponsored service function unit 1855 for a sponsored service.

According to an embodiment of the present disclosure, the application layer 1810 may include a general application layer 1812 and a sponsored service application layer 1814. The general application layer 1812 may perform a general application-related operation, and the sponsored service application layer 1814 may perform a sponsored service application-related operation.

According to an embodiment of the present disclosure, the platform layer 1820 may include at least one of an Android layer 1825, a sponsored service platform layer 1830, and an Android platform 1840.

In an embodiment of the present disclosure, the Android layer 1825 may perform an IMS message-related operation.

The sponsored service platform layer 1830 may include at least one of an error handling unit 1831 for handling an error, application interface unit 1832 in charge of an interface of an application, a user interface unit 1833 for providing a user interface, a service control unit 1834 for controlling all services, a token handling unit 1835 for handling a sponsored service-related token, a network communication unit 1836 for performing a network communication-related operation, and a packet counting unit 1837 for counting a sponsored service-related packet.

The Android platform 1840, according to an embodiment of the present disclosure, may be replaced by another platform according to an operating system, and may perform an operation for controlling the UE in a driving system.

In an embodiment of the present disclosure, the modem layer 1850 may perform an operation capable of transmitting a message, which has been transmitted by the platform layer 1820, to the outside.

In an embodiment of the present disclosure, the respective functions or layers may not be an essential configuration, but may be selectively provided.

Figure 19:
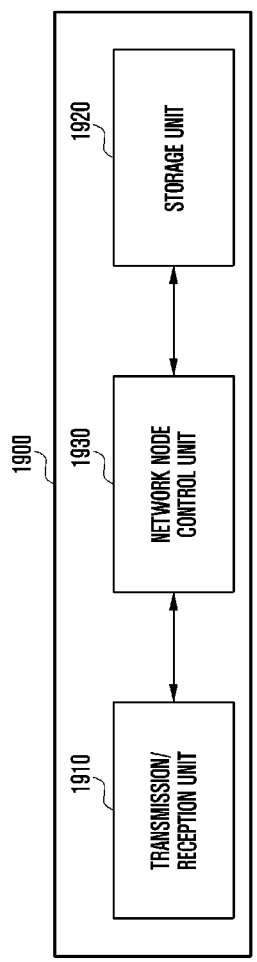
FIG. 19 is a block diagram illustrating a configuration of a network node according to an embodiment of the present disclosure.

FIG. 19 is a block diagram illustrating a configuration of a network node according to an embodiment of the present disclosure.

Referring to FIG. 19, a network node 1900 may correspond to at least one of a base station, a PGW, a PCRF, a sponsored service server, an AF, a P-CSCF, an S-CSCF, and a TDF.

The network node 1900 may include at least one of a transmission/reception unit 1910, a storage unit 1920, and a network node control unit 1930.

In an embodiment of the present disclosure, the transmission/reception unit 1910 may transmit/receive a signal to/from at least one of the UE and another network node.

The storage unit 1920 may store at least one piece of information among information required for an operation of the network node 1900 and information transmitted/received by the transmission/reception unit 1910.

The network node control unit 1930 may control an overall operation of the network node 1900, may make a determination based on at least one piece of information among information transmitted/received by the transmission/reception unit 1910 and information stored in the storage unit 1920, and may perform an operation according to a result of the determination. In addition, the network node control unit 1930 may control the operations of the network node described in embodiments of the present disclosure.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a Read-Only Memory (ROM), a Random-Access Memory (RAM), Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for transmitting and receiving a signal by a terminal in a mobile communication system, the method comprising:
    acquiring, from a server associated with a service, first information associated with a charging policy of the service, in response to executing an application related to the service;
    transmitting, to a network, a data packet related to the service, the first information associated with the charging policy of the service being included in a header of the data packet;
    receiving, from the network, a response related to the service corresponding to the data packet;
    transmitting or receiving data related to the service generated by the application based on the response,
    transmitting, to the network, a request message to remove the service based on termination of the application associated with the service;
    removing at least some data related to the service in response to receiving a response message corresponding to the request message from the network; and
    displaying the termination of the service,
    wherein the header of the data packet includes second information that represents that the transmitted data packet is a sponsored service-related message,
    wherein the first information associated with the charging policy of the service is transmitted to a node related to the charging policy of the network when the second information is included in the header of the data packet, and
    wherein the data related to the service is charged based on the first information associated with the charging policy of the service.

2. The method of claim 1, wherein the first information associated with the charging policy of the service comprises at least one piece of information among a service identifier, a policy for providing the service, and information on a time period during which the first information associated with the charging policy of the service is valid.

3. The method of claim 1, wherein the first information associated with the charging policy of the service is preset for the terminal.

4. The method of claim 1, wherein the charging policy related to the service is determined based on the first information associated with the charging policy of the service transmitted to the network.

5. The method of claim 1, further comprising:
    installing an application related to the service; and
    determining validity of the installed application,
    wherein the transmitting of the data packet including the first information associated with the charging policy of the service comprises transmitting the first information associated with the charging policy of the service to the network if the installed application is valid.

6. The method of claim 5, wherein the installing of the application related to the service comprises:
    determining a type of the installed application; and
    disposing an icon corresponding to the application at a preset location according to the determined type.

7. The method of claim 1, wherein the transmitting or receiving of the data related to the service comprises:
    determining a setting related to data communication of the terminal; and
    transmitting or receiving the data related to the service based on a type of the service if the setting limits the data communication.

8. The method of claim 1, further comprising displaying information representing that the transmitted or received data corresponds to the data related to the service.

9. The method of claim 1, further comprising transmitting, to the network, a data packet including information for preventing the first information associated with the charging policy of the service from being applied, if the data related to the service is not transmitted or received.

10. The method of claim 1, further comprising:
    driving a timer in response to the transmission of the data packet;
    retransmitting the data packet if the response to the data packet is not received until the timer expires; and
    stopping the transmission of the data packet if a number of times of the retransmissions of the data packet exceeds a preset number of times.

11. A terminal for transmitting and receiving a signal in a mobile communication system, the terminal comprising:

a transceiver configured to transmit and receive a signal; and at least one processor coupled with the transceiver and configured to:
- acquire, from a server associated with a service, first information associated with a charging policy of the service, in response to executing an application related to the service,
- transmit, to a network, a data packet related to the service, first information associated with the charging policy of the service being included in a header of the data packet,
- receive a response to the data packet from the network, and
- transmit or receive data related to the service generated by the application based on the response,
- transmit, to the network, a request message to remove the service based on termination of the application associated with the service,
- remove at least some data related to the service in response to receiving a response message corresponding to the request message from the network, and
- display the termination of the service, wherein the header of the data packet includes second information that represents that the transmitted data packet is a sponsored service-related message, wherein the first information associated with the charging policy of the service is transmitted to a node related to the charging policy of the network when the second information is included in the header of the data packet, and wherein the data related to the service is charged based on the first information associated with the charging policy of the service.

12. The terminal of claim 11, wherein the first information associated with the charging policy of the service comprises at least one piece of information among a service identifier, a policy for providing the service, and information on a time period during which the first information associated with the charging policy of the service is valid.

13. The terminal of claim 11, wherein the first information associated with the charging policy of the service is preset for the terminal.

14. The terminal of claim 11, wherein the charging policy related to the service is determined based on the first information associated with the charging policy of the service transmitted to the network.

15. The terminal of claim 11, wherein the at least one processor is further configured to:
- install an application related to the service,
- determine validity of the installed application, and
- transmit the information related to the service to the network if the installed application is valid.

16. The terminal of claim 15, wherein the at least one processor is further configured to:
- determine a type of the installed application, and
- dispose an icon corresponding to the application at a preset location according to the determined type.

17. The terminal of claim 11, wherein the at least one processor is further configured to:
- determine a setting related to data communication of the terminal, and
- transmit or receive the data related to the service based on a type of the service if the setting limits the data communication.

18. The terminal of claim 11,
wherein the terminal further comprises a display, and
wherein the display is configured to provide a graphical user interface for representing that the transmitted or received data corresponds to the data related to the service.

19. The terminal of claim 11, wherein the at least one processor is further configured to control the transceiver to transmit, to the network, a data packet including information for preventing the first information associated with the charging policy of the service from being applied, if the data related to the service is not transmitted or received.

20. The terminal of claim 11, wherein the at least one processor is further configured to:
- drive a timer in response to the transmission of the data packet,
- retransmit the data packet if the response to the data packet is not received until the timer expires, and
- stop the transmission of the data packet if a number of times of the retransmissions of the data packet exceeds a preset number of times.

21. The method of claim 1, wherein the the sponsored service-related application comprises information for providing a service, the information including at least one of a service IDentifier (ID), basic uniform resource locator (URL), a service plan, or token information.

* * * * *